United States Patent
Kimura et al.

(10) Patent No.: US 10,274,344 B2
(45) Date of Patent: Apr. 30, 2019

(54) DISPLACEMENT ENCODER

(71) Applicant: MITUTOYO CORPORATION, Kanagawa (JP)

(72) Inventors: Akihide Kimura, Saitama (JP); Joseph Daniel Tobiason, Woodinville, WA (US)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 16/012,064

(22) Filed: Jun. 19, 2018

(65) Prior Publication Data
US 2018/0299300 A1 Oct. 18, 2018

Related U.S. Application Data

(63) Continuation-in-part of application No. 15/391,243, filed on Dec. 27, 2016, now Pat. No. 10,094,685.

(51) Int. Cl.
*G01D 5/34* (2006.01)
*G01D 5/347* (2006.01)
*G01D 5/38* (2006.01)

(52) U.S. Cl.
CPC ..... *G01D 5/34746* (2013.01); *G01D 5/34715* (2013.01); *G01D 5/38* (2013.01)

(58) Field of Classification Search
CPC .. G01D 5/347; G01D 5/34707; G01D 5/3473; G01D 5/34746

(Continued)

(56) References Cited

U.S. PATENT DOCUMENTS

| 5,249,032 A | 9/1993 | Matsui et al. |
| 7,480,060 B2 | 1/2009 | Goldman |

(Continued)

FOREIGN PATENT DOCUMENTS

| JP | H08219812 A | 8/1996 |
| JP | 2619566 | 6/1997 |
| JP | 4856844 | 1/2012 |

OTHER PUBLICATIONS

Hane et al., "Optical Encoder Using Metallic Surface Grating", Journal of the Japan Society for Precision Engineering, vol. 64., No. 10, Oct. 5, 1998, pp. 1532-1536 with a partial English translation.

(Continued)

*Primary Examiner* — Kevin K Pyo
(74) *Attorney, Agent, or Firm* — Greenblum & Bernstein, P.L.C.

(57) ABSTRACT

A detection head movable relative to a scale detects diffracted light and outputs a detection result. The diffracted light is diffracted by an incremental pattern. A signal processing unit calculates a relative displacement between the scale and the detection head. The detection head includes: a light source emitting the light to the scale; and a detection unit including a light-receiving unit receiving the diffracted light through an optical element, in which the light-receiving elements outputting detection signals are periodically arranged with a predetermined period. The number of the plurality of light-receiving elements is an even number. The predetermined period is a value obtained by multiplying a fundamental period by an odd-number. The fundamental period is a period of interference fringes formed on the light-receiving unit by +1st and −1st order diffracted lights. A width of the light-receiving element is not equal to an integral multiple of the fundamental period.

12 Claims, 28 Drawing Sheets

(58) Field of Classification Search
USPC ............. 250/237 G, 231.13, 231.14, 231.16, 250/231.18; 356/499, 521
See application file for complete search history.

(56) References Cited

U.S. PATENT DOCUMENTS

| | | |
|---|---|---|
| 2004/0090637 A1 | 5/2004 | Holzapfel et al. |
| 2007/0102630 A1 | 5/2007 | Igaki |
| 2008/0062432 A1* | 3/2008 | Sandig .................... G01D 5/38 356/499 |
| 2017/0261351 A1 | 9/2017 | Nagura |
| 2018/0087931 A1 | 3/2018 | Laman |
| 2018/0216972 A1* | 8/2018 | Slack ................. G01D 5/34715 |

OTHER PUBLICATIONS

Search Report dated Dec. 21, 2018 in GB Patent Application GB1810421.6.

* cited by examiner

DISPLACEMENT ENCODER

CROSS REFERENCES TO RELATED APPLICATIONS

This Application is a continuation-in-part application of the pending U.S. patent application Ser. No. 15/391,243, filed on Dec. 27, 2016, the contents of which is hereby incorporated by reference in their entireties.

BACKGROUND OF THE INVENTION

Field of the Invention

The present invention relates to a displacement encoder.

Description of Related Art

Currently, as a type of an apparatus for measuring a displacement, an optical displacement encoder is known. The optical displacement encoder includes a scale and a detection head that moves along the scale. The scale is provided with, for example, an absolute pattern for detecting a reference position and an incremental pattern for detecting a relative displacement between the scale and the detection head. The optical displacement encoder determines the reference position by using a reference signal which is a result of the detection of the absolute pattern on the scale. Further, a positional relation between the scale and the detection head can be detected by taking account of (i.e., can be detected based on) a displacement relative to the reference position obtained from a detection result of the incremental pattern.

In general, the incremental pattern is formed as a diffraction grating in which a plurality of grating patterns are arranged in a measurement direction. Light is applied (i.e., emitted) to this diffraction grating and an optical intensity of interference fringes that are formed by interference between +1st order diffracted light and −1st order diffracted light diffracted by the diffraction grating is detected. In this type of optical displacement encoder, in order to accurately detect interference fringes between the +1st order and −1st order diffracted light, it is necessary to prevent or minimize the effect on the interference fringes caused by diffracted light having the other orders such as 0th order diffracted light.

For example, a displacement encoder in which 0th order diffracted light is removed by disposing an optical block between a light source and a scale has been proposed (Japanese Patent No. 2619566). In this displacement encoder, an index grating is interposed between the light source and the scale and light is applied from the light source to the index grating. A shield for blocking the 0th order diffracted light is interposed between the index grating and the scale. This shield is disposed in such a position that the 0th order diffracted light is blocked but the +1st order and −1st order diffracted light are not blocked. Therefore, while the +1st order and −1st order diffracted light reach the scale, the 0th order diffracted light does not reach the scale. As a result, only the +1st order and −1st order diffracted light travel from the scale to a detection unit, thus making it possible to prevent the effect of the 0th order diffracted light.

Further, another example of a displacement encoder using an index grating has been proposed (Japanese Patent No. 4856844). In this displacement encoder, light is applied from a light source to a scale and diffracted light that has passed through the scale is detected. An index grating is interposed between the scale and a detection unit. Further, a diffraction grating is formed (i.e., disposed) only in a place on which +1st order and −1st order diffracted light of the diffracted light coming from the scale are incident, so that the other orders of diffracted light including 0th order diffracted light are blocked. The +1st order and −1st order diffracted light incident on the index grating are diffracted by the diffraction grating and interference fringes are formed on the detection unit. In this way, only the +1st order and −1st order diffracted light travel from the scale to the detection unit, thus making it possible to prevent the effect of the 0th order diffracted light.

Further, a displacement encoder in which 0th order diffracted light is removed by using a spatial filter has been proposed (Kazuhiro Hane, others: 2, "Optical Encoder Using Metallic Surface Grating", Journal of the Japan Society for Precision Engineering, Vol. 64, No. 10, 1998). In this displacement encoder, laser light is applied to a scale and resultant diffracted light is collimated by a collimator lens. Then, a spatial filter in which a slit is disposed in such a place that only +1st order and −1st order diffracted light of the collimated diffracted light having various orders coming from the collimator lens pass therethrough is used, so that the other orders of diffracted light including 0th order diffracted light are blocked. After that, by converging the +1st order and −1st order diffracted light on a detection unit by a convergence lens, interference fringes can be formed on the detection unit.

In addition, as a solution for the 0th order diffracted light, a configuration capable of preventing the 0th order diffracted light from being generated by optimizing a fine structure of the grating has been proposed (Japanese Unexamined Patent Application Publication No. H8-219812).

SUMMARY OF THE INVENTION

However, there are the following problems in the above-described displacement encoders disclosed in of Japanese Patent No. 2619566, Japanese Patent No. 4856844, and "Optical Encoder Using Metallic Surface Grating". As described above, it is necessary to add optical elements such as an index grating, a lens, and a spatial filter in order to remove the effect of 0th order diffracted light. As a result, the size of the displacement encoder would be increased and the structure thereof could become complicated.

Further, in these examples, the +1st order and −1st order diffracted light are separated from the other orders of diffracted light by using a difference in the diffraction angle. However, when diffracted light orders need to be completely separated, the distance between the optical elements needs to be increased, because the distance by which different orders of diffracted light are separated from each other could not otherwise be increased. Therefore, the size of the displacement encoder could be further increased.

In Japanese Unexamined Patent Application Publication No. H8-219812, since only the grating whose structure is optimized can be used, optical design of the entire encoder is restricted.

The present invention has been made in view of the above-described circumstances and an object of the present invention is to provide a displacement encoder capable of improving position detection accuracy by removing effects of unwanted diffracted light.

A first exemplary aspect of the present invention is a displacement encoder including:

a scale with an incremental pattern formed therein;

a detection head movable relative to the scale in a measurement direction, the detection head being configured to detect diffracted light and output a detection result, the diffracted light being obtained by diffraction of light emitted to the scale by the incremental pattern; and a signal processing unit configured to calculate a relative displacement between the scale and the detection head based on the detection result obtained by the detection head, in which the detection head includes:

a light source configured to emit the light to the scale;

a detection unit including a light-receiving unit including a plurality of light-receiving elements periodically arranged in the measurement direction with a predetermined period, the plurality of light-receiving elements being configured to output a detection signal of the diffracted light from the scale; and an optical element configured to guide the diffracted light to the detection unit, the number of the plurality of light-receiving elements arranged in the measurement direction is an even number, the predetermined period is a value obtained by multiplying a fundamental period by an odd-number, the fundamental period being a period of interference fringes formed on the light-receiving unit by +1st order diffracted light and −1st order diffracted light of the diffracted light, and a width of the light-receiving element in the measurement direction is not equal to an integral multiple of the fundamental period.

A second exemplary aspect of the present invention is the above-described displacement encoder, in which the +1st order diffracted light, −1st order diffracted light, and 0th order diffracted light from the scale are incident on the detection unit.

A third exemplary aspect of the present invention is the above-described displacement encoder, in which the light-receiving unit comprises a plurality of detection areas arranged in the measurement direction, each detection unit comprises the even number of the light-receiving elements arranged in the measurement direction; and among the plurality of detection areas, two detection areas adjacent to each other are shifted from each other by a distance equivalent to a quarter of the fundamental period so as to be apart from each other in the measurement direction.

A fourth exemplary aspect of the present invention is the above-described displacement encoder, in which first and second detection areas are arranged in this order in the measurement direction, and the detection unit outputs a detection signal output from the first detection area to the signal processing unit as an A phase signal and outputs a detection signal output from the second detection area to the signal processing unit as a B phase signal.

A fifth exemplary aspect of the present invention is the above-described displacement encoder, in which first, second, third and fourth detection areas are arranged in this order in the measurement direction, and the detection unit outputs a differential A phase signal and a differential B phase signal to the signal processing unit, the differential A phase signal being a differential signal between an A phase signal and an A− phase signal, the differential B phase signal being a differential signal between a B phase signal and a B− phase signal, the A phase signal being a detection signal output from the first detection area, the A− phase signal being a detection signal output from the third detection area, the B phase signal being a detection signal output from the second detection area, and the B− phase signal being a detection signal output from the fourth detection area.

A sixth exemplary aspect of the present invention is the above-described displacement encoder, in which the light-receiving unit comprises a plurality of detection areas arranged in the measurement direction, each detection unit comprises the even number of the light-receiving elements arranged in the measurement direction; and among the plurality of detection areas, two detection areas adjacent to each other are shifted from each other by a distance equivalent to one third of the fundamental period so as to be apart from each other in the measurement direction.

A seventh exemplary aspect of the present invention is the above-described displacement encoder, in which first, second and third detection areas are arranged in this order in the measurement direction in the detection unit, and the detection unit outputs a differential A phase signal and a differential B phase signal to the signal processing unit, the differential A phase signal and the differential B phase signal being generated by combining an A phase signal, a B phase signal, and a C phase signal, and having phases different from each other by 90°, the A phase signal being a detection signal output from the first detection area, the B phase signal being a detection signal output from the second detection area, and the C phase signal being a detection signal output from the third detection area.

An eighth exemplary aspect of the present invention is the above-described displacement encoder, in which the optical element condenses the +1st order diffracted light and −1st order diffracted light to form the interference fringes on the detection unit.

A ninth exemplary aspect of the present invention is the above-described displacement encoder, in which the optical element comprises one of a diffraction grating and a lens.

A tenth exemplary aspect of the present invention is the above-described displacement encoder, in which the optical element comprises two mirrors, one mirror reflects the +1st order diffracted light to the detection unit, and the other mirror reflects the −1st order diffracted light to the detection unit.

An eleventh exemplary aspect of the present invention is the above-described displacement encoder, in which k is an integer equal to or more than two, the fundamental period is P, k detection areas arranged in a direction traverse to the measurement direction constitute a detection sequence, the detection areas are shifted with respect to each other by a pitch of P/k.

A twelfth exemplary aspect of the present invention is the above-described displacement encoder, in which n is an integer equal to or more than one, k detection sequences are periodically arranged in the measurement direction with a pitch of nP+P/k.

According to the present invention, it is possible to provide a displacement encoder capable of improving position detection accuracy by removing unwanted effects of unnecessary diffracted light.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Exemplary embodiments according to the present invention are explained hereinafter with reference to the drawings. The same symbols are assigned to the same components throughout the drawings, and their duplicated explanations are omitted as appropriate.

First Exemplary Embodiment

Figure 1:
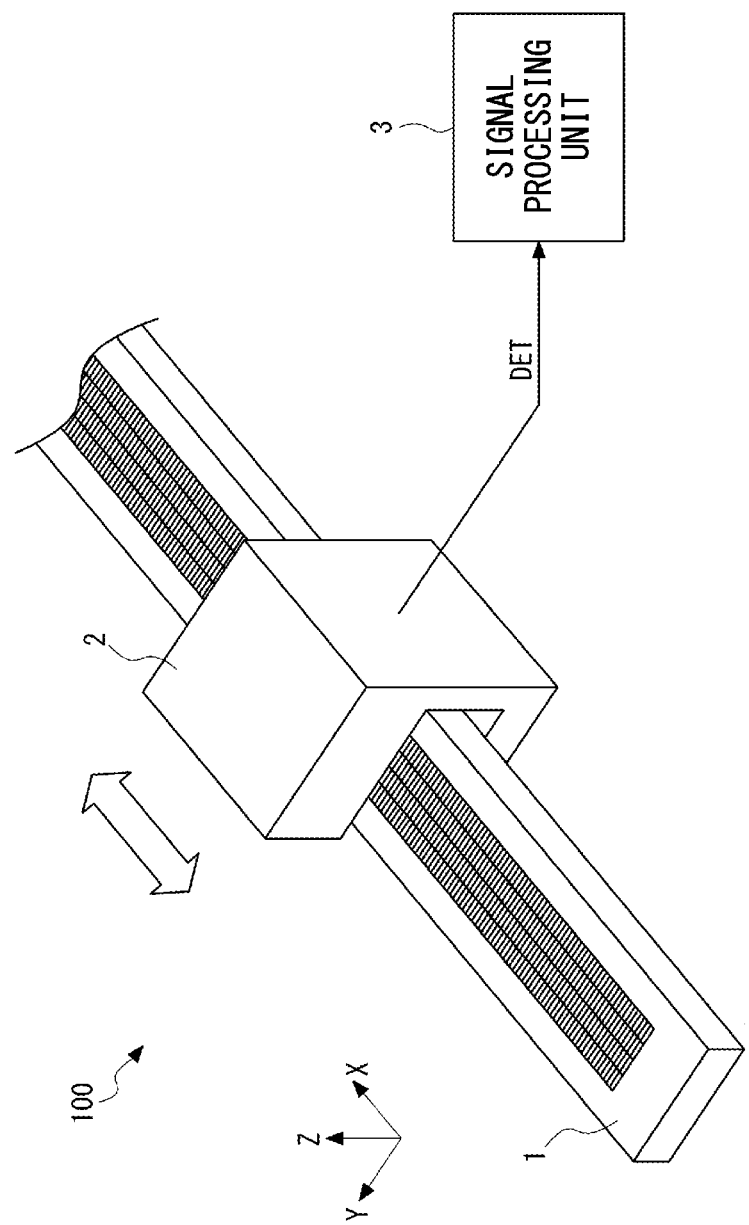
FIG. 1 is a perspective view showing a general configuration of an optical displacement encoder 100 according to a first exemplary embodiment.

An optical displacement encoder according to a first exemplary embodiment of the present invention is explained. FIG. 1 is a perspective view showing a general configuration of an optical displacement encoder 100 according to the first exemplary embodiment. An example case where the optical displacement encoder 100 is constructed as a transmission-type displacement encoder is explained hereinafter. As shown in FIG. 1, the optical displacement encoder 100 includes a scale 1, a detection head 2, and a signal processing unit 3. The scale 1 and the detection head 2 are configured so that they can be moved relative to each other along a measurement direction (an X-axis direction in FIG. 1) which is in parallel with the longitudinal direction of the scale 1. A pattern used for position detection is formed in the scale 1. When light is applied (i.e., emitted) to the pattern, interference light is generated. The detection head 2 detects a change in the interference light in the measurement direction and outputs a detection signal DET, which is an electric signal indicating the detection result, to the signal processing unit 3. The signal processing unit 3 performs signal processing on the received detection signal DET and thereby calculates a positional relation between the scale 1 and the detection head 2.

Note that a direction that is perpendicular to the measurement direction (the X-axis direction in FIG. 1) and in parallel with the width direction of the scale 1 is defined as a Y-axis direction in the following explanation. That is, the principal surface of the scale 1 is an X-Y plane (i.e., in parallel with an X-Y plane). Further, a direction that is perpendicular to the principal surface (the X-Y plane) of the scale 1, i.e., the direction that is perpendicular to both the X- and Y-axes is defined as a Z-axis direction. Further, in the below-explained perspective views, a direction from the lower-left corner toward the upper-right corner on the drawing is defined as a positive direction on the X-axis. A direction from the lower-right corner toward the upper-left corner on the drawing is defined as a positive direction on the Y-axis. Further, a direction from the bottom toward the top on the drawing is defined as a positive direction on the Z-axis.

Figure 2:
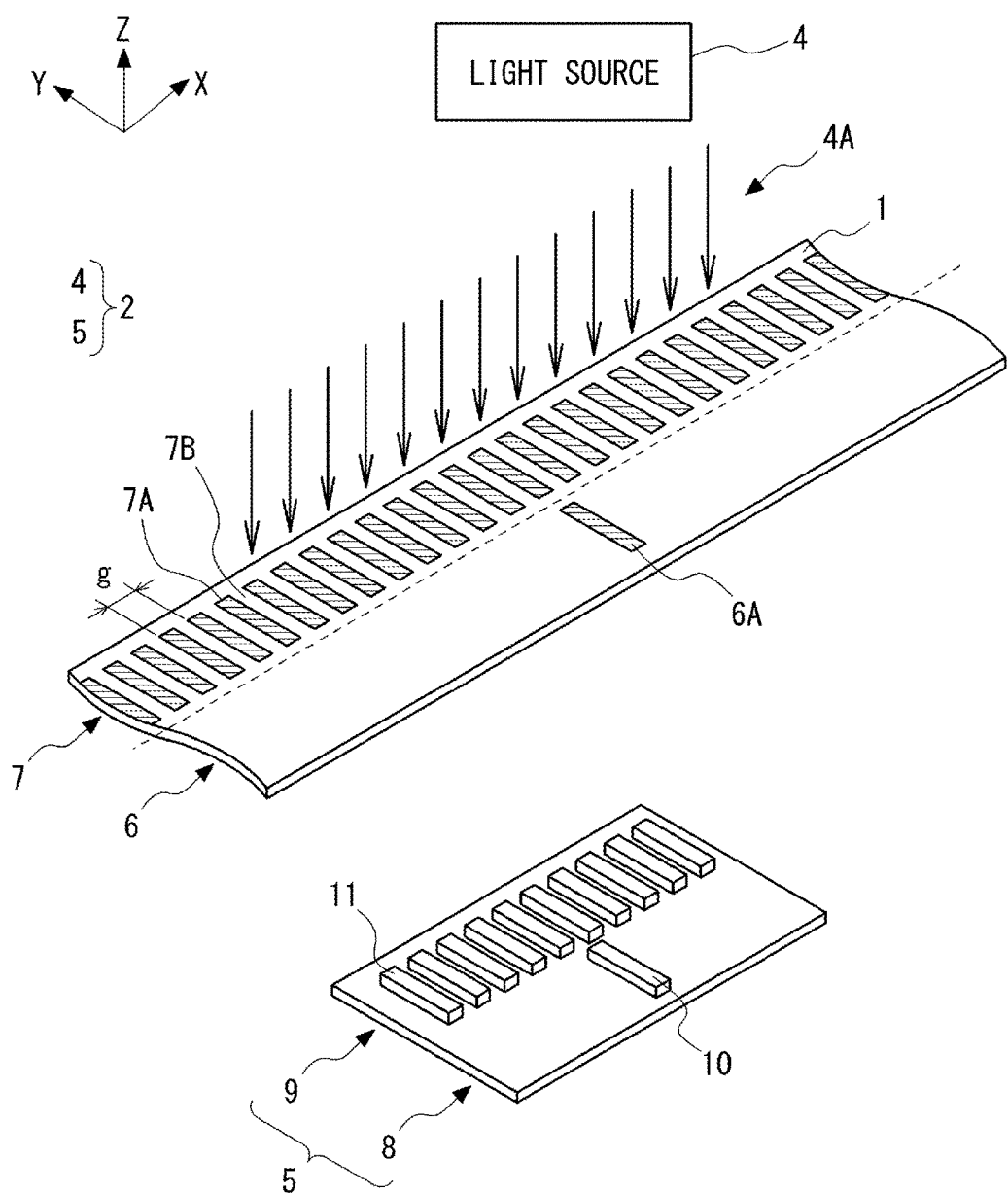
FIG. 2 is a perspective view showing a configuration of the optical displacement encoder 100 according to the first exemplary embodiment.

The optical displacement encoder 100 is explained hereinafter in a more detailed manner. FIG. 2 is a perspective view showing a configuration of the optical displacement encoder 100 according to the first exemplary embodiment. As shown in FIG. 2, the detection head 2 includes a light source 4 and a detection unit 5. As described above, the scale 1 and the detection head 2 are configured so that they can be moved relative to each other in the measurement direction (the X-axis direction in FIG. 2).

The light source 4 is a light source that outputs collimated light 4A. The light source 4 includes, for example, a light source element and a collimator. Light output from the light source is collimated by the collimator and thereby becomes the collimated light 4A. Examples of available light sources include an LED (Light Emitting Diode), a semiconductor laser, an SLED (Superluminescent Light Emitting Diode), and an OLED (Organic light-emitting diode). Further, as for the collimator, various collimating means such as a lens optical system can be used.

The scale 1 is formed as a plate member whose principal surface (the X-Y plane) is perpendicular to the Z-axis and whose longitudinal direction is in parallel with the X-axis direction in FIG. 2. The scale 1 is disposed in a place where the collimated light 4A from the light source 4 is incident on its principal surface (the X-Y plane) at a right angle. In FIG. 2, the scale 1 is disposed on the negative side in the Z-axis direction with respect to the light source 4. A reference pattern 6 and an incremental pattern 7 are formed in the plate member constituting the scale 1.

As a typical example of the reference pattern 6, one light-transmitting part 6A having a grid-like shape (or a slender rectangular shape) whose longitudinal direction is in parallel with the Y-direction in FIG. 2 is formed. However, the pattern of the reference pattern 6 is not limited to this example. That is, other patterns such as one composed of a plurality of grid patterns can be used as appropriate.

As for the incremental pattern 7, a plurality of grid-like light-transmitting parts whose longitudinal direction is in parallel with the Y-direction in FIG. 2 are arranged in a row in the X-axis direction. That is, light-transmitting parts 7A and non-transmitting parts 7B are alternately and repeatedly arranged in the X-axis direction with a pitch g in the incremental pattern 7.

The scale 1 is preferably formed of glass. In such a case, non-transmitting parts are formed by a metallic film that is vapor-deposited on the glass and areas where no metallic film is formed serve as light-transmitting parts. However, any material from which grid-like light-transmitting parts, which let light pass therethrough, and non-transmitting parts, which do not let light pass therethrough, can be formed can be used as the material for the scale 1.

The detection unit 5 is configured so that it can detect light that has passed through the scale 1. The detection unit 5 includes light-receiving units 8 and 9. The light-receiving units 8 and 9 are arranged side by side in the Y-axis direction. The detection unit 5 outputs signals output by the light-receiving units 8 and 9 as a detection signal DET.

The light-receiving unit 8 is configured so that it can detect light that has passed through the reference pattern 6. Further, the light-receiving unit 8 outputs a detection result to the signal processing unit 3. In this example, a light-receiving element 10 is disposed to detect light that has passed through the light-transmitting part 6A of the reference pattern 6. In this way, the light-receiving unit 8 outputs an electric signal that is obtained by converting the light that has passed through the light-transmitting part 6A of the reference pattern 6 into the electric signal (an optical/electrical conversion) to the signal processing unit 3.

The light-receiving unit 9 is configured so that it can detect light that has passed through the incremental pattern 7. Further, the light-receiving unit 9 outputs a detection result to the signal processing unit 3. For example, the light-receiving unit 9 outputs an electric signal that is obtained by converting the light that has passed through the incremental pattern 7 into the electric signal (an optical/electrical conversion) to the signal processing unit 3. The light-receiving unit 9 is formed as a light-receiving element array in which an even number of light-receiving elements 11 (e.g., photodiodes) are arranged with a pitch suitable for detecting interference fringes formed by light diffracted by the incremental pattern 7.

Alternatively, the light-receiving unit 9 may have a configuration in which a diffraction grating including an even number of light-transmitting parts arranged therein is disposed above a photodiode having a large light-receiving area. In such a case, each of the parts where respective light-receiving elements are disposed substantially functions as the above-described light-receiving element.

Figure 3:
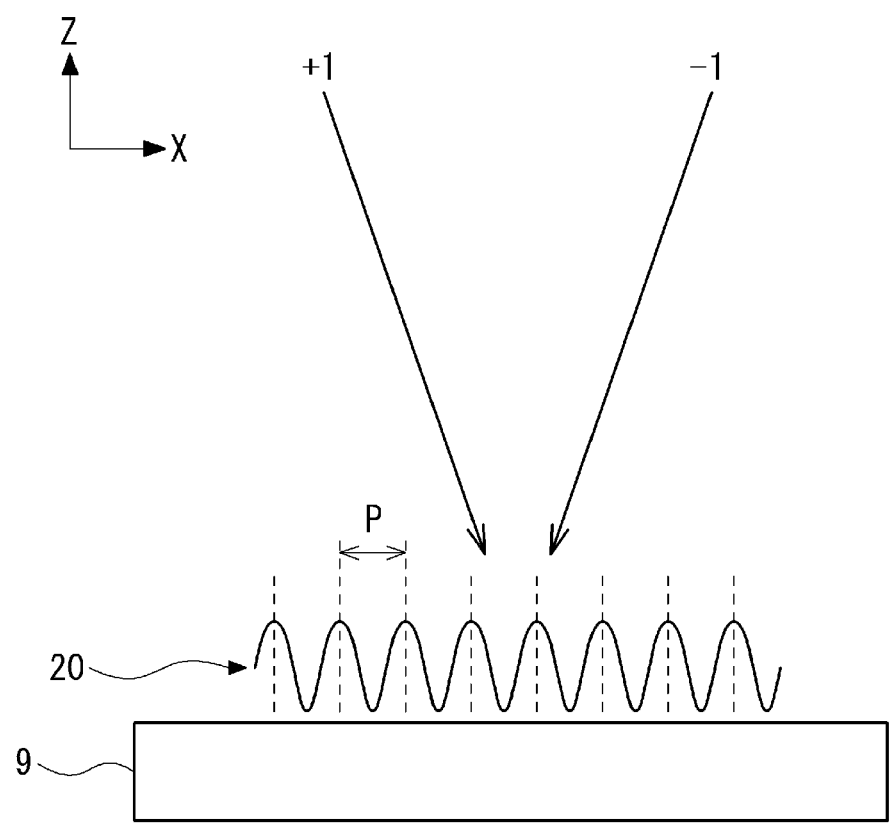
FIG. 3 shows interference fringes formed on a detection unit by +1st order diffracted light and −1st order diffracted light.

Next, interference fringes formed on the light-receiving unit 9 are explained. Light that has passed through the unit 9 is diffracted therein and the diffracted light forms interference fringes on the light-receiving unit 9. Firstly, interference fringes 20 formed on the light-receiving unit 9 by +1st order diffracted light and −1st order diffracted light are explained hereinafter. FIG. 3 shows the interference fringes 20 formed on the light-receiving unit 9 by the +1st order and −1st order diffracted light. As shown in FIG. 3, the interference fringes 20 having a period P are formed on the light-receiving unit 9 by the +1st order and −1st order diffracted light. Hereinafter, the period of the interference fringes 20 formed on the light-receiving unit 9 by the +1st order and −1st order diffracted light is referred to as a "fundamental period P".

However, other orders of diffracted light, i.e., diffracted light having orders other than the +1st order and −1st order that have passed through the incremental pattern 7 are also incident on the light-receiving unit 9. Among the other orders of diffracted light, 0th order diffracted light has a large optical intensity. Therefore, the interference fringes formed on the light-receiving unit 9 are affected by the 0th order diffracted light.

Figure 4:
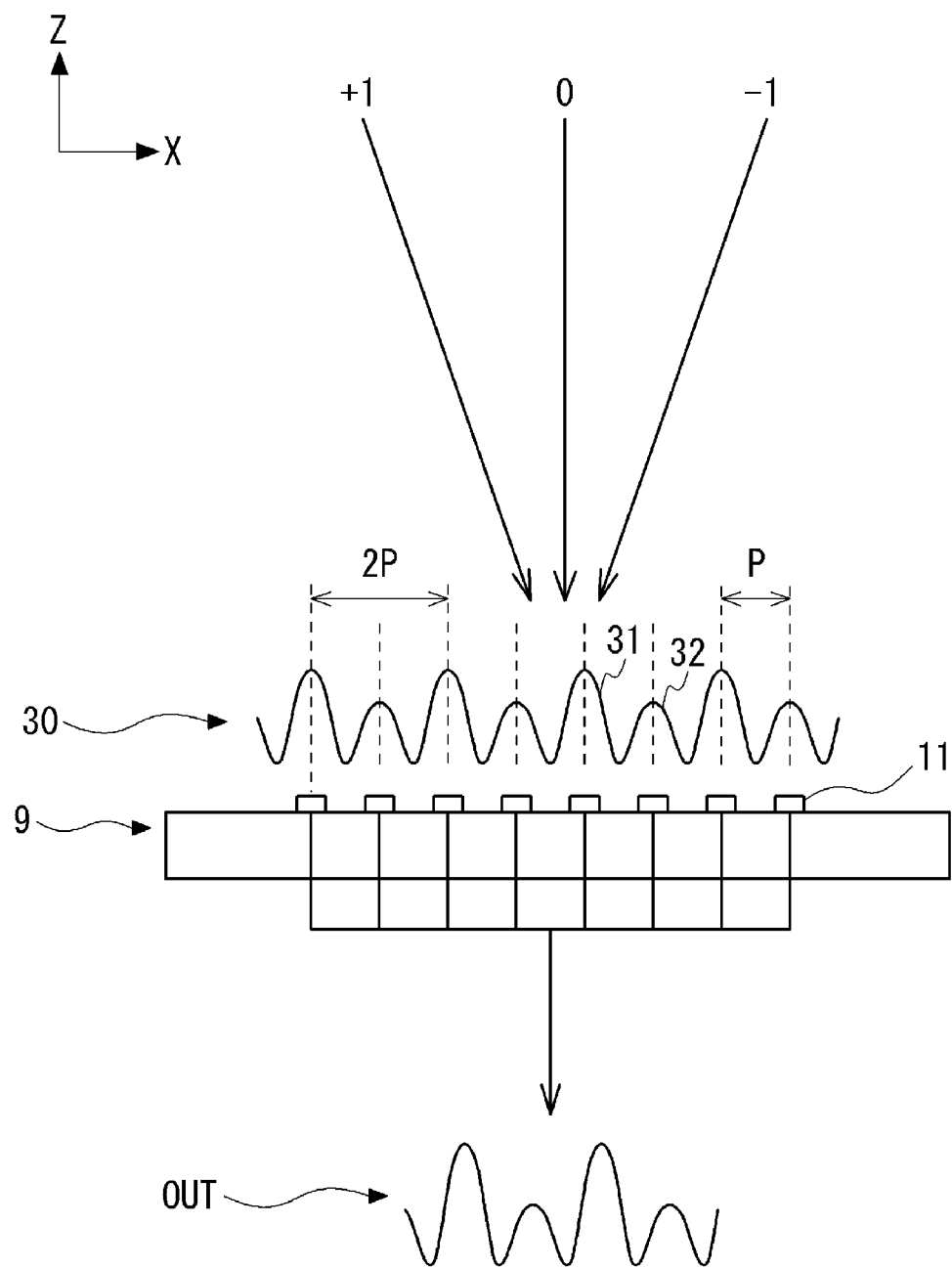
FIG. 4 shows interference fringes formed on a detection unit by +1st order diffracted light, −1st order diffracted light, and 0th order diffracted light.

FIG. 4 shows interference fringes 30 formed on the light-receiving unit 9 by +1st order diffracted light, −1st order diffracted light, and 0th order diffracted light. As shown in FIG. 4, high peaks 31 and low peaks 32 alternately appear in the interference fringes 30 formed on the light-receiving unit 9 by the +1st order diffracted light, the −1st order diffracted light, and the 0th order diffracted light. Since the high peaks 31 and the low peaks 32 are apart from each other by a distance equivalent to the fundamental period P, the interference fringes 30 have a waveform in which high peaks 31 and low peaks 32 repeatedly (and alternately) appear with a period 2P, i.e., twice the fundamental period P. Therefore, when the optical intensity of the interference fringes 30 is simply converted into an electric signal (an optical/electrical conversion), an output signal OUT, which indicates the conversion result, also has a waveform in which high peaks and low peaks appear with the period 2P, i.e., twice the fundamental period P.

To cope with this, in the optical displacement encoder 100, the effect of unnecessary interference terms such as the above-described 0th order diffracted light is reduced or prevented by configuring and arranging the light-receiving elements of the light-receiving unit 9 in conformity with the below-shown design conditions. The configuration and arrangement of the light-receiving elements 11 of the light-receiving unit 9 in this exemplary embodiment are explained hereinafter in detail. In the light-receiving unit 9, a plurality of light-receiving elements 11 are arranged in the X-direction so that the following design conditions 1 to 3 are satisfied.

[Design Condition 1]

In this exemplary embodiment, the light-receiving elements 11 of the light-receiving unit 9 are arranged so that the number of light-receiving elements 11 arranged in the X-direction becomes an even number. Hereinafter, this condition is referred to as a "Design Condition 1".

[Design Condition 2]

Further, in this exemplary embodiment, the light-receiving elements 11 of the light-receiving unit 9 are arranged so that a period (or a cycle) with which the light-receiving elements 11 are arranged in the X-direction becomes an odd-number multiple of the fundamental period P of the interference fringes (i.e., a number that is obtained by multiplying the fundamental period P by an odd number). Hereinafter, this condition is referred to as a "Design Condition 2".

[Design Condition 3]

Further, in this exemplary embodiment, the light-receiving elements 11 of the light-receiving unit 9 are formed so that a width W of each of the light-receiving elements 11 in the X-direction is not equal to an integral multiple of the fundamental period P of the interference fringes (i.e., a number that is obtained by multiplying the fundamental period P by an integer). Hereinafter, this condition is referred to as a "Design Condition 3".

By satisfying the above-described design conditions 1 to 3, the light-receiving unit 9 can remove the effect of the periodicity of twice the fundamental period P on the interference fringes 30 caused by the 0th order diffracted light, thus making it possible to obtain an output signal that changes with the fundamental period P. The mechanism for this feature is explained hereinafter by using examples.

Example 1

Figure 5:
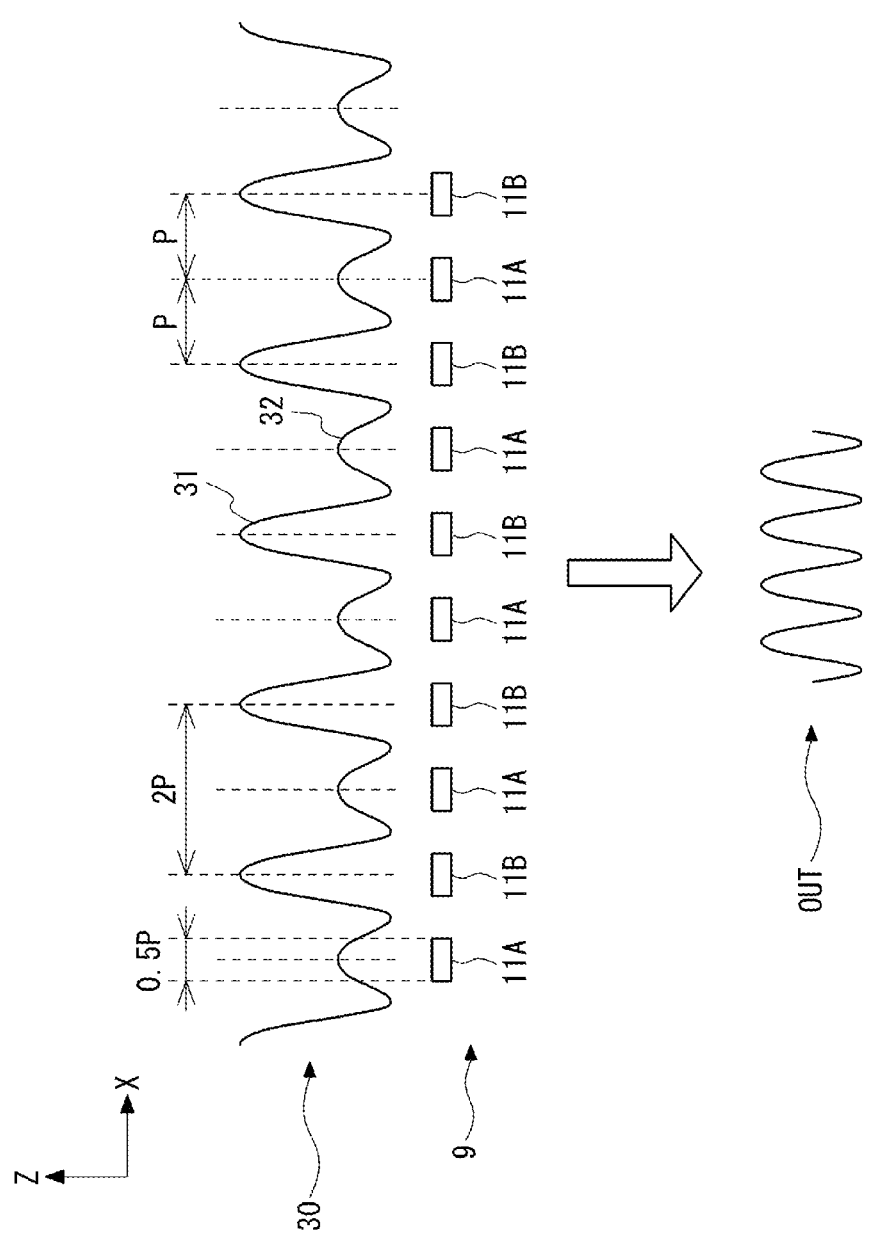
FIG. 5 shows a relation between interference fringes and light-receiving elements according to Example 1.

FIG. 5 shows a relation between interference fringes and light-receiving elements according to Example 1. In Example 1, the number of arranged light-receiving elements is ten and the period (i.e., the cycle) with which the light-receiving elements are arranged (hereinafter referred to as an "arrangement period") is equal to the fundamental period P of the interference fringes. Further, the width W of each of the light-receiving elements is 0.5 times the fundamental period P (i.e., a half of the fundamental period P) of the interference fringes. Note that in this example, light-receiving elements 11A and light-receiving elements 11B are alternately arranged.

As for the light-receiving elements 11A, they are arranged with a period 2P, i.e., twice the fundamental period P as shown in FIG. 5. As for the light-receiving elements 11B, they are also arranged with the period 2P, i.e., twice the fundamental period P. That is, the light-receiving elements 11A detect an optical intensity at a phase θ in the interference fringes, which change with the period 2P, i.e., twice the fundamental period P. Meanwhile, the light-receiving elements 11B detect an optical intensity at a phase (θ+2π) in the interference fringes, which change with the period 2P, i.e., twice the fundamental period P.

Hereinafter, a half of the number of arranged light-receiving elements is represented by n and the intensity of light at the phase θ detected by each of the light-receiving elements 11A and 11B is represented by I(θ). The phase θ is defined for the fundamental period P. Every time the phase θ changes by 2π, the interference fringes move by a distance equivalent to the fundamental period P. Further, since the interference fringes 30 have a period twice the fundamental period P as described above, the optical intensity I(θ) detected at the phase θ by each of the light-receiving elements 11A and 11B has the same value every time the phase θ changes by 4π. That is, relations "I(θ)≠I(θ+2π)" and "I(θ)=I(θ+4π)" hold. These relations also hold in the below-described examples and comparative examples. Here, the below-shown Expression [1] holds under the above-explained conditions.

$$I_{TOTAL} = nI(\theta) + nI(\theta + 2\pi) \qquad [1]$$

where $I_{TOTAL}$ is the intensity of light detected by the light-receiving unit 9.

As shown in the below-shown Expression [2], Expression [1] has the same value every time the phase changes by 2π. Therefore, in the intensity $I_{TOTAL}$, peaks having the same height appear with a period equal to the fundamental period P.

$$\begin{aligned} I_{TOTAL} &= nI(\theta + 2\pi) + nI(\theta + 2\pi + 2\pi) \\ &= nI(\theta + 2\pi) + nI(\theta) \\ &= nI(\theta) + nI(\theta + 2\pi) \end{aligned} \qquad [2]$$

From the above explanation, it can be understood that an output signal OUT that rises and falls with the fundamental period P can be obtained.

Example 2

Figure 6:
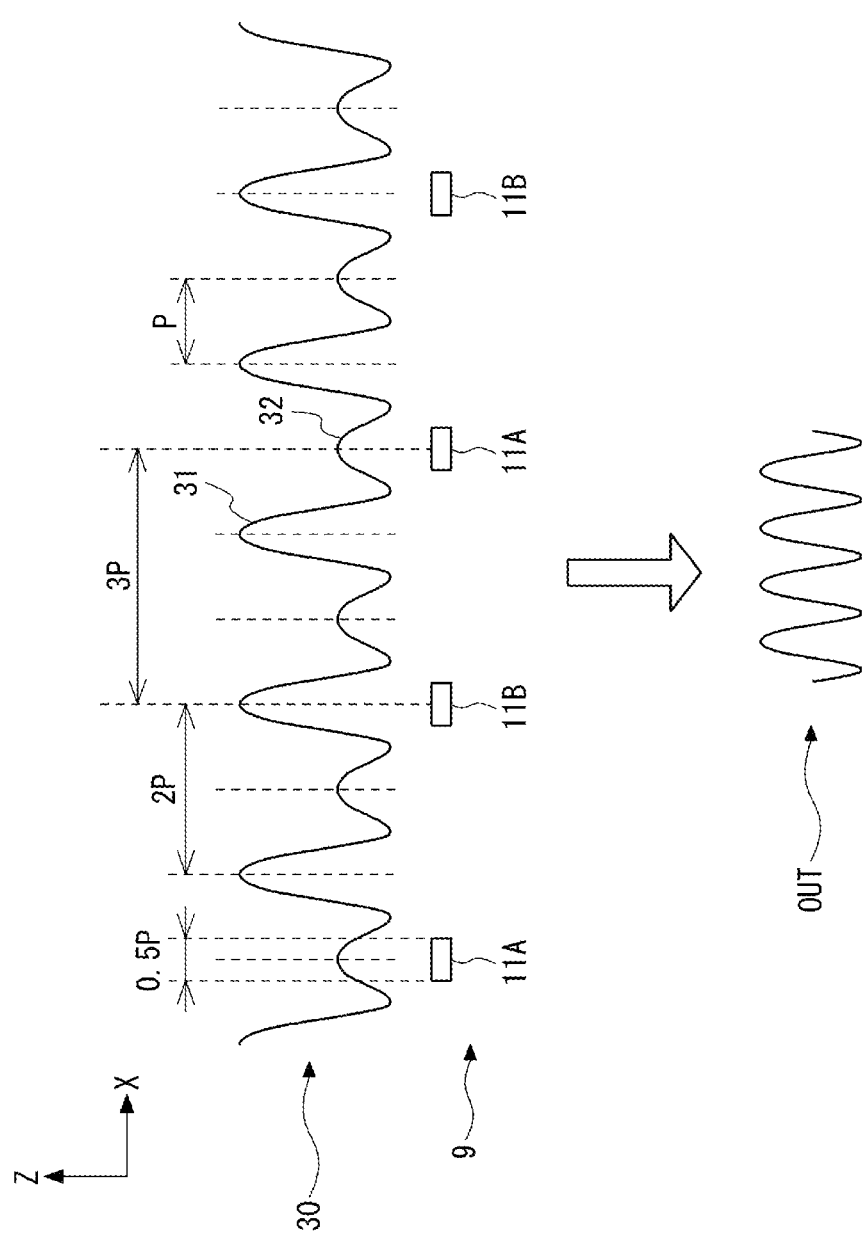
FIG. 6 shows a relation between interference fringes and light-receiving elements according to Example 2.

FIG. 6 shows a relation between interference fringes and light-receiving elements according to Example 2. In Example 2, the number of arranged light-receiving elements is four and the arrangement period of the light-receiving elements is three times the fundamental period P of the interference fringes. Further, the width W of each of the light-receiving elements is 0.5 times the fundamental period P of the interference fringes. In this example, light-receiving elements 11A and light-receiving elements 11B are alternately arranged.

As for the light-receiving elements 11A, they are arranged with a period 6P, i.e., six times the fundamental period P as shown in FIG. 6. As for the light-receiving elements 11B, they are also arranged with a period 6P, i.e., six times the fundamental period P. That is, the light-receiving elements 11A detect an optical intensity at a phase θ in the interference fringes, which change with the period 2P, i.e., twice the fundamental period P. Meanwhile, the light-receiving elements 11B detect an optical intensity at a phase (θ+6π) in the interference fringes, which change with the period 2P, i.e., twice the fundamental period P.

The below-shown Expression [3] holds.

$$I_{TOTAL} = nI(\theta) + nI(\theta + 6\pi) \qquad [3]$$

$$= nI(\theta) + nI(\theta + 2\pi + 4\pi)$$

$$= nI(\theta) + nI(\theta + 2\pi)$$

where: n is a half of the number of arranged light-receiving elements; I(θ) is the intensity of light at the phase θ detected by each of the light-receiving elements 11A and 11B; and $I_{TOTAL}$ is the intensity of light detected by the light-receiving unit 9.

That is, Expression [3] is the same as Expression [1] of Example 1. Therefore, similarly to Example 1, in the intensity $I_{TOTAL}$, peaks having the same height appear with a period equal to the fundamental period P. From the above explanation, it can be understood that an output signal OUT that rises and falls with the fundamental period P can be obtained.

Example 3

Figure 7:
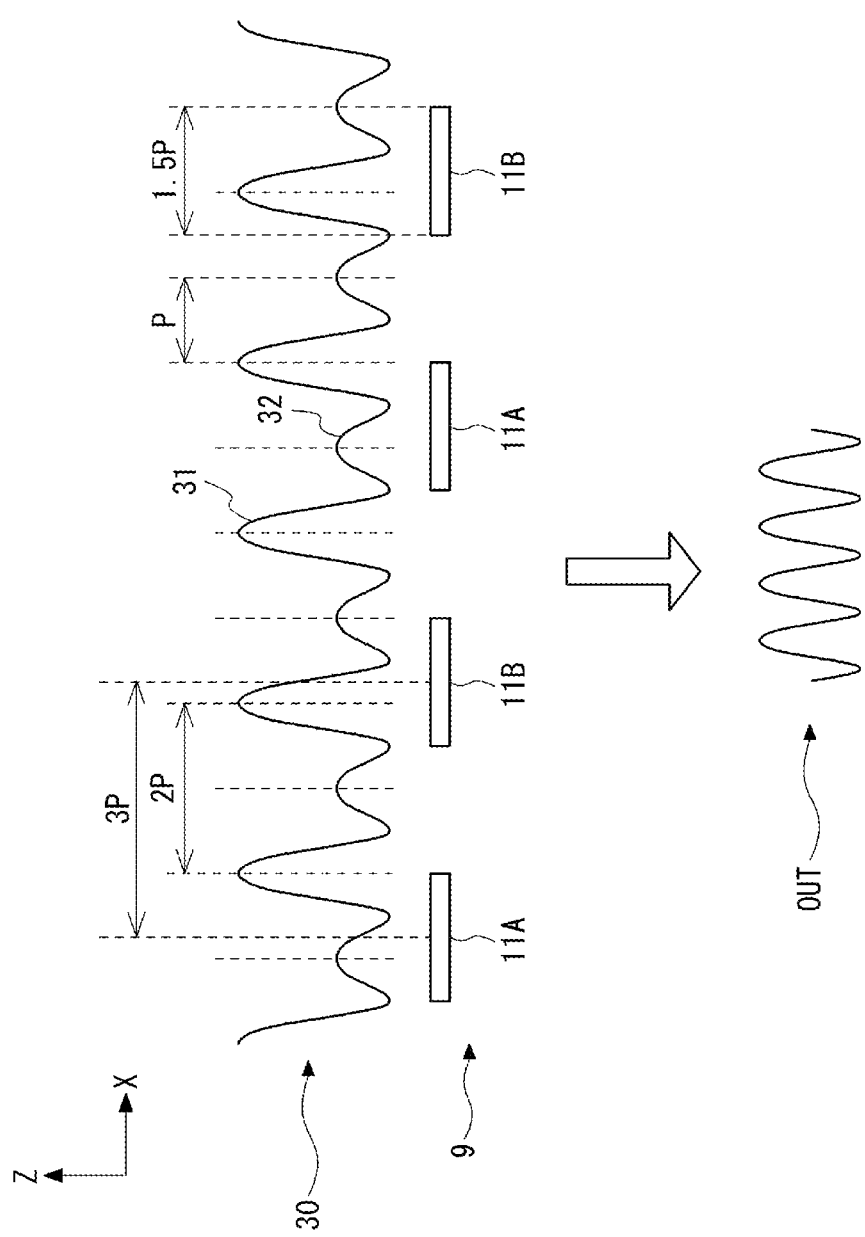
FIG. 7 shows a relation between interference fringes and light-receiving elements according to Example 3.

FIG. 7 shows a relation between interference fringes and light-receiving elements according to Example 3. In Example 3, the number of arranged light-receiving elements is four and the arrangement period of the light-receiving elements is three times the fundamental period P of the interference fringes. Further, the width W of each of the light-receiving elements is 1.5 times the fundamental period P of the interference fringes. In this example, light-receiving elements 11A and light-receiving elements 11B are alternately arranged.

In this configuration, although the width of each of the light-receiving elements differs from that in Examples 1 and 2, the light-receiving elements 11A detect the same waveform as that in Examples 1 and 2 and the light-receiving elements 11B also detect the same waveform as that in Examples 1 and 2. Further, the number of light-receiving elements 11A is equal to the number of light-receiving elements 11B. Therefore, Expressions [1] and [2] hold as in the case of Example 1. As a result, similarly to Example 2, an output signal OUT that rises and falls with the fundamental period P can be obtained.

Example 4

Figure 8:
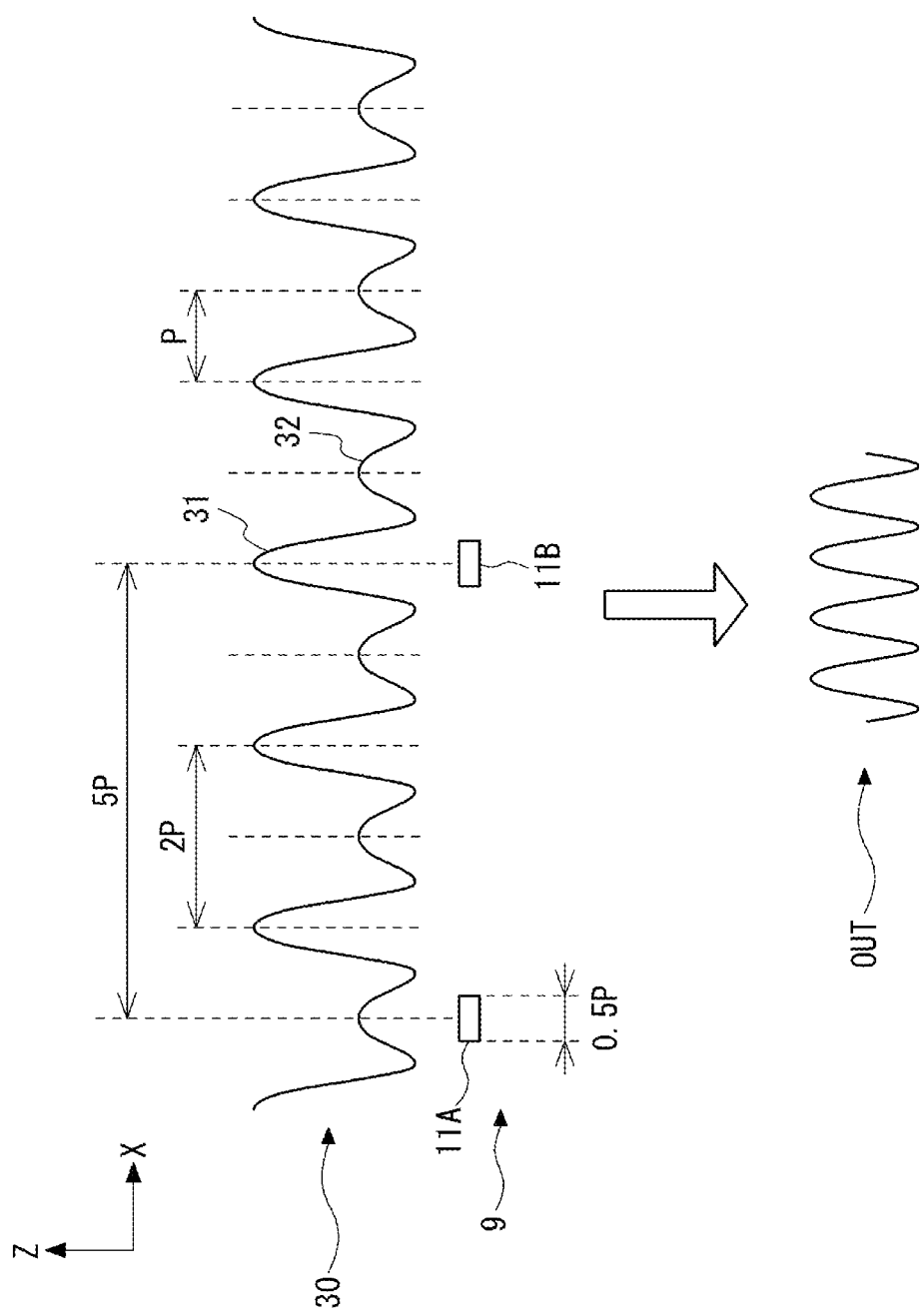
FIG. 8 shows a relation between interference fringes and light-receiving elements according to Example 4.

FIG. 8 shows a relation between interference fringes and light-receiving elements according to Example 4. In Example 4, the number of arranged light-receiving elements is two and the arrangement period of the light-receiving elements is five times the fundamental period P of the interference fringes. Further, the width W of each of the light-receiving elements is 1.5 times the fundamental period P of the interference fringes. In this example, light-receiving elements 11A and light-receiving elements 11B are alternately arranged.

In this configuration, although the number of light-receiving elements and the width of each light-receiving element differ from those in Example 3, the light-receiving element 11A is apart from the light-receiving element 11B by a distance that is five times the fundamental period P. Consequently, the above-shown Expressions [1] and [2] hold. As a result, similarly to Example 3, an output signal OUT that rises and falls with the fundamental period P can be obtained.

Example 5

Figure 9:
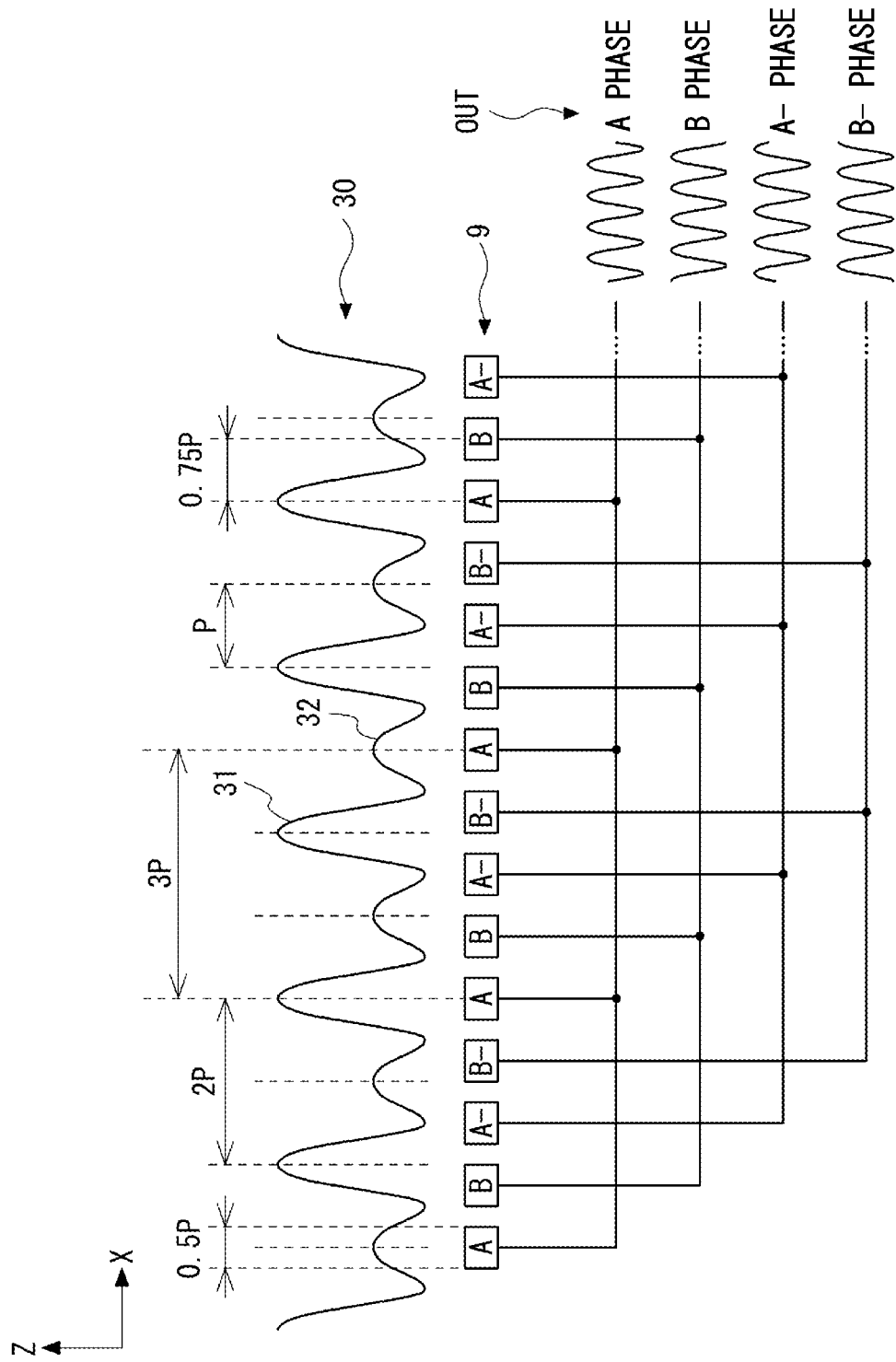
FIG. 9 shows a relation between interference fringes and light-receiving elements according to Example 5.

An Example 5 is a modified example of Example 2 and is an example in which four-phase signals are obtained. FIG. 9 shows a relation between interference fringes and light-receiving elements according to Example 5. In Example 5, the number of arranged light-receiving elements for each phase is an even number and the arrangement period of the light-receiving elements for each phase is three times the fundamental period P of the interference fringes. Further, the width W of each of the light-receiving elements for each phase is 0.5 times the fundamental period P of the interference fringes. Further, in this example, light-receiving elements for an A phase, a B phase, an A– phase, and a B– phase are indicated by using symbols A, B, A– and B–, respectively.

As shown in FIG. 9, each of light-receiving elements 12 to 15 for the A, B, A– and B–phases, respectively, are arranged in a manner similar to that for the light-receiving elements 11 (light-receiving elements 11A and 11B) according to Example 2. In other words, although the arrangement period of light-receiving elements adjacent to each other is 0.75 times the fundamental period P, because of the fact that Example 5 is configured so that four-phase signals are obtained, when attention is given to the light-receiving elements for each phase, the arrangement of the light-receiving elements for each phase is similar to that in Example 2. That is, according to Example 5, an output signal OUT that rises and falls with the fundamental period P can be obtained without being affected by unnecessary interference light as in the case of Example 2.

Further, for comparisons with the above-described examples, comparative examples in which at least one of the above-described design conditions 1 to 3 is not satisfied are examined.

Comparative Example 1

Figure 10:
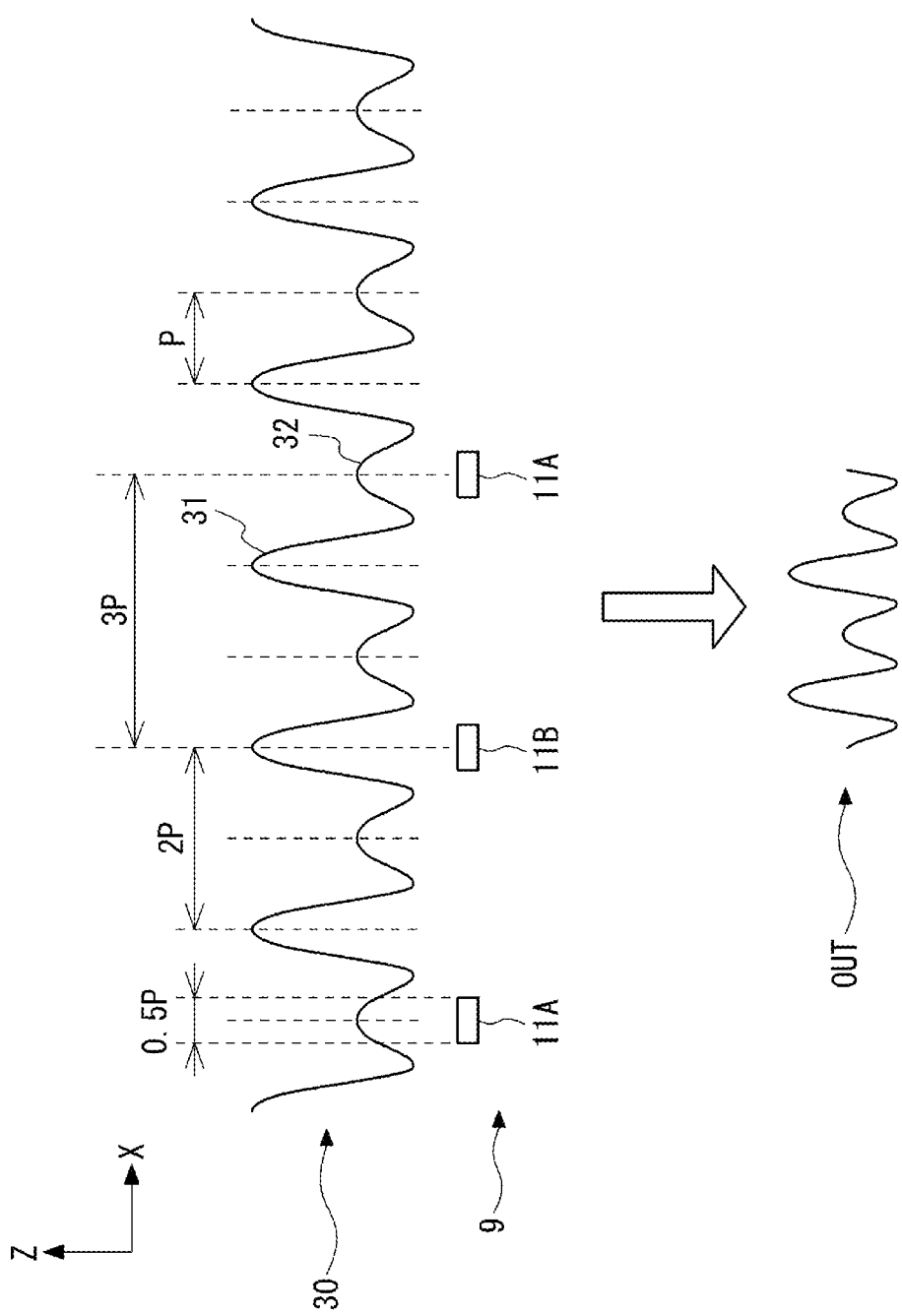
FIG. 10 shows a relation between interference fringes and light-receiving elements according to a Comparative Example 1.

FIG. 10 shows a relation between interference fringes and light-receiving elements according to Comparative Example 1. In Comparative Example 1, the number of arranged light-receiving elements is three and the arrangement period of the light-receiving elements is three times the fundamental period P of the interference fringes. Further, the width W of each of the light-receiving elements is 0.5 times the fundamental period P of the interference fringes. In this example, light-receiving elements 11A and light-receiving elements 11B are alternately arranged. That is, Comparative Example 1 does not satisfy the above-described Design Condition 1.

The below-shown Expression [4] holds.

$$I_{TOTAL}=(m+1)I(\theta)+mI(\theta+2\pi) \qquad [4]$$

where: m is a value obtained by dividing the number of arranged light-receiving elements by two; I(θ) is the intensity of light at the phase θ detected by each of the light-receiving elements 11A and 11B; and $I_{TOTAL}$ is the intensity of light detected by the light-receiving unit 9.

In Expression [4], when the phase changes by 2π, i.e., by the fundamental period P, the below-shown Expression [5] is obtained.

$$I_{TOTAL} = (m+1)I(\theta + 2\pi) + mI(\theta + 2\pi + 2\pi) \qquad [5]$$

$$= (m+1)I(\theta + 2\pi) + mI(\theta)$$

Since the interference fringes change with the period 2P, i.e., twice the fundamental period P as described above, the optical intensities of the interference fringes at places that are apart from each other by the fundamental period P are not equal to each other. Therefore, the value of the intensity $I_{TOTAL}$ in Expression [3] differs from that in Expression [4].

In Expression [4], when the phase changes by $4\pi$, i.e., twice the fundamental period P, the below-shown Expression [6] is obtained.

$$I_{TOTAL} = (m+1)I(\theta + 4\pi) + mI(\theta + 2\pi + 4\pi) \qquad [6]$$
$$= (m+1)I(\theta) + mI(\theta + 2\pi)$$

Therefore, Expression [5] becomes identical to Expression [3]. That is, in the intensity $I_{TOTAL}$, peaks having the same height appear with a period equal to twice the fundamental period P. As a result, the output signal OUT becomes a signal that changes with the period equal to twice the fundamental period P as in the case of the interference fringes 30 and has a waveform in which peaks having different heights are present in a mixed manner. Consequently, the accuracy of position detection deteriorates.

Comparative Example 2

Figure 11:
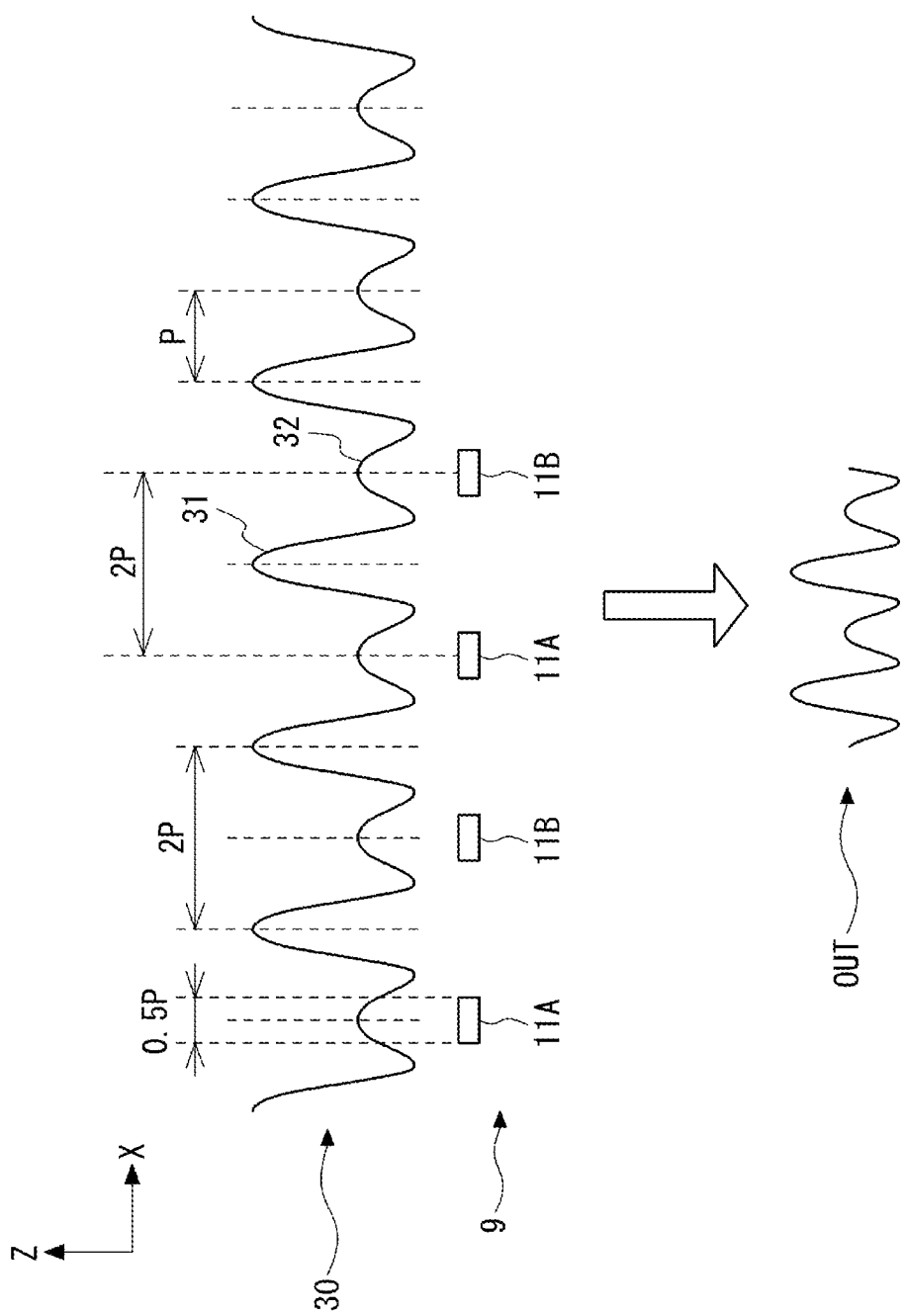
FIG. 11 shows a relation between interference fringes and light-receiving elements according to a Comparative Example 2.

FIG. 11 shows a relation between interference fringes and light-receiving elements according to Comparative Example 2. In Comparative Example 2, the number of arranged light-receiving elements is four and the arrangement period of the light-receiving elements is twice the fundamental period P of the interference fringes. Further, the width W of each of the light-receiving elements is 0.5 times the fundamental period P of the interference fringes. In this example, light-receiving elements 11A and light-receiving elements 11B are alternately arranged. That is, Comparative Example 2 does not satisfy the above-described Design Condition 2.

As for the light-receiving elements 11A, they are arranged with a period 4P, i.e., four times the fundamental period P as shown in FIG. 11. As for the light-receiving elements 11B, they are also arranged with the period 4P, i.e., four times the fundamental period P.

The below-shown Expression [7] holds.

$$I_{TOTAL} = nI(\theta) + nI(\theta + 4\pi) \qquad [7]$$
$$= 2nI(\theta)$$

where: n is a half of the number of arranged light-receiving elements; $I(\theta)$ is the intensity of light at the phase $\theta$ detected by each of the light-receiving elements 11A and 11B; and $I_{TOTAL}$ is the intensity of light detected by the light-receiving unit 9.

That is, since the intensity $I_{TOTAL}$ directly reflects the optical intensity of the interference fringes at the phase $\theta$ as shown in Expression [6], it changes with the period 2P i.e., twice the fundamental period P as in the case of the interference fringes. As a result, the output signal OUT becomes a signal that changes with a period equal to twice the fundamental period P as in the case of the interference fringes 30 and has a waveform in which peaks having different heights are present in a mixed manner. Consequently, the accuracy for position detection deteriorates.

Comparative Example 3

Figure 12:
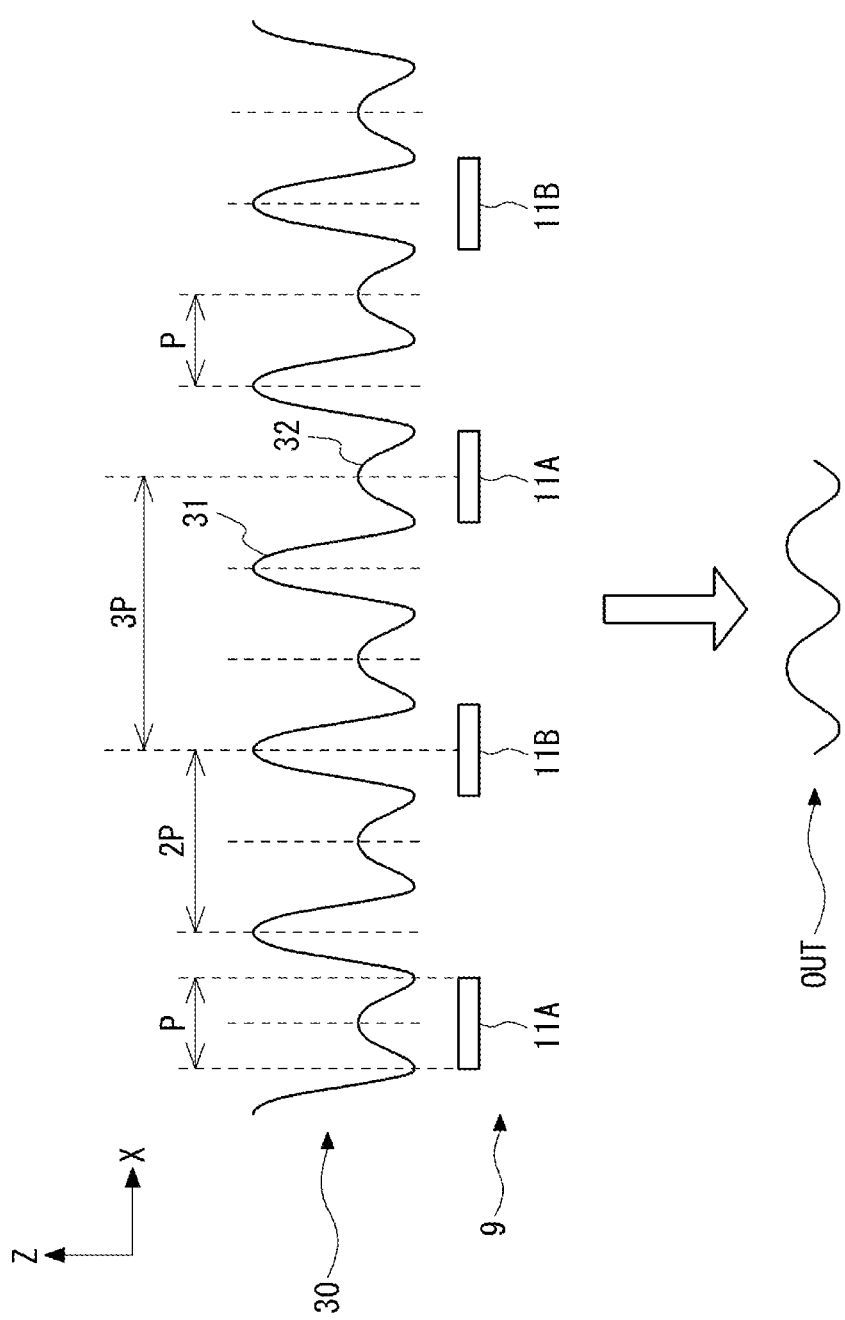
FIG. 12 shows a relation between interference fringes and light-receiving elements according to a Comparative Example 3.

FIG. 12 shows a relation between interference fringes and light-receiving elements according to Comparative Example 3. In Comparative Example 3, the number of arranged light-receiving elements is four and the arrangement period of the light-receiving elements is three times the fundamental period P of the interference fringes. Further, the width W of each of the light-receiving elements is equal to the fundamental period P of the interference fringes. In this example, light-receiving elements 11A and light-receiving elements 11B are alternately arranged. That is, Comparative Example 3 does not satisfy the above-described Design Condition 3.

In this example, the waveform of the interference fringes detected by the light-receiving elements 11A is the same as the waveform of the interference fringes in Example 2. Further, the waveform of the interference fringes detected by the light-receiving elements 11B is also the same as the waveform of the interference fringes in Example 2. However, since the width W of each of the light-receiving elements is equal to the fundamental period P, the output signal OUT from the 9 is smoothed. As a result, the period of the output signal OUT is twice the fundamental period P. That is, since the period of the output signal OUT becomes longer than the fundamental period P, the accuracy for position detection deteriorates accordingly.

In this example, the case where the width W of each of the light-receiving elements is equal to the fundamental period P is explained. However, the above-described matter also holds true when the width W of each of the light-receiving elements is an odd-number multiple of the fundamental period P.

Comparative Example 4

Figure 13:
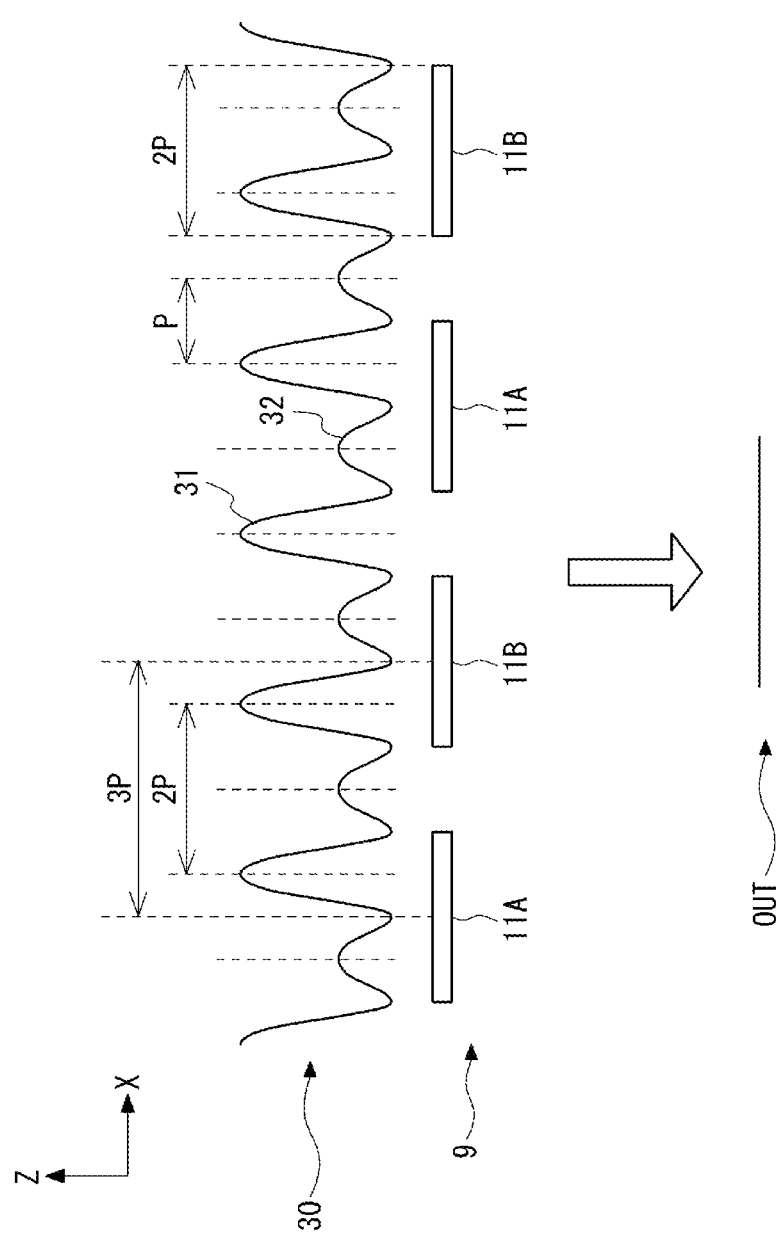
FIG. 13 shows a relation between interference fringes and light-receiving elements according to a Comparative Example 4.

FIG. 13 shows a relation between interference fringes and light-receiving elements according to Comparative Example 4. In Comparative Example 4, the number of arranged light-receiving elements is four and the arrangement period of the light-receiving elements is three times the fundamental period P. Further, the width W of each of the light-receiving elements is twice the fundamental period P of the interference fringes. That is, Comparative Example 4 does not satisfy the above-described Design Condition 3.

In this example, the waveform of the interference fringes detected by the light-receiving elements 11A is the same as the waveform of the interference fringes in Example 2. Further, the waveform of the interference fringes detected by the light-receiving elements 11B is also the same as the waveform of the interference fringes in Example 2. However, since the width W of each of the light-receiving elements is twice the fundamental period P and equal to the period of the interference fringes 30, the intensity of the light detected by the light-receiving unit 9 becomes constant. As a result, the output signal OUT becomes a signal having no periodicity, thus making it impossible to carry out the position detection.

In this example, the case where the width W of each of the light-receiving elements is twice the fundamental period P is explained. However, the above-described matter also holds true when the width W of each of the light-receiving elements is an even-number multiple of the fundamental period P.

In the above explanation, attention is given to the 0th order diffracted light, which has the largest effect among the unnecessary diffracted light. However, the configuration according to this exemplary embodiment can also reduce the effect caused by unnecessary diffracted light having other orders. The mechanism for this feature is explained hereinafter by using an example in which the effect caused by +2nd order diffracted light and −2nd order diffracted light is reduced or prevented.

When complex amplitudes of +2nd order diffracted light, +1st order diffracted light, 0th order diffracted light, −1st order diffracted light, and −2nd order diffracted light are represented by $u_{+2}$, $u_{+1}$, $u_0$, $u_{-1}$ and $u_{-2}$, respectively, interference fringes formed on the light-receiving unit 9 can be expressed as a sum total I of products of these five complex amplitudes and their conjugate five complex amplitudes. Note that the conjugate of the complex amplitude of diffracted light having a given order is indicated by a bar added above its symbol.

$$I = (u_{-2} + u_{-1} + u_0 + u_{+1} + u_{+2}) \cdot (\overline{u_{-2}} + \overline{u_{-1}} + \overline{u_0} + \overline{u_{+1}} + \overline{u_{+2}}) =$$
$$u_{-2} \cdot \overline{u_{-2}} + u_{-2} \cdot \overline{u_{-1}} + u_{-2} \cdot \overline{u_0} + u_{-2} \cdot \overline{u_{+1}} + u_{-2} \cdot \overline{u_{+2}} + u_{-1} \cdot \overline{u_{-2}} +$$
$$u_{-1} \cdot \overline{u_{-1}} + u_{-1} \cdot \overline{u_0} + u_{-1} \cdot \overline{u_{+1}} + u_{-1} \cdot \overline{u_{+2}} + u_0 \cdot \overline{u_{-2}} + u_0 \cdot \overline{u_{-1}} + u_0 \cdot \overline{u_0} +$$
$$u_0 \cdot \overline{u_{+1}} + u_0 \cdot \overline{u_{+2}} + u_{+1} \cdot \overline{u_{-2}} + u_{+1} \cdot \overline{u_{-1}} + u_{+1} \cdot \overline{u_0} + u_{+1} \cdot \overline{u_{+1}} +$$
$$u_{+1} \cdot \overline{u_{+2}} + u_{+2} \cdot \overline{u_{-2}} + u_{+2} \cdot \overline{u_{-1}} + u_{+2} \cdot \overline{u_0} + u_{+2} \cdot \overline{u_{+1}} + u_{+2} \cdot \overline{u_{+2}}$$

The period of interference fringes indicated by each term of the above-shown expression can be calculated from the traveling directions of two diffracted light. Since the period of interference fringes formed by the +1st order and −1st order diffracted light is the fundamental period P, the period of interference fringes of each term is as indicated in the below-shown table.

| Terms | Period of interference fringes | Characteristic of interference fringes |
|---|---|---|
| $u_{-1} \cdot \overline{u_{+1}}$, $u_{+1} \cdot \overline{u_{-1}}$ | Fundamental period | Signal component |
| $u_{-2} \cdot \overline{u_{-2}}$, $u_{-1} \cdot \overline{u_{-1}}$, $u_0 \cdot \overline{u_0}$, $u_{+1} \cdot \overline{u_{+1}}$, $u_{+2} \cdot \overline{u_{+2}}$ | Not modulated (DC component) | Unnecessary interference fringes |
| $u_0 \cdot \overline{u_{+1}}$, $u_{+1} \cdot \overline{u_0}$, $u_0 \cdot \overline{u_{-1}}$, $u_{-1} \cdot \overline{u_0}$ | Twice of fundamental period | |
| $u_{+1} \cdot \overline{u_{+2}}$, $u_{+2} \cdot \overline{u_{+1}}$, $u_{-1} \cdot \overline{u_{-2}}$, $u_{-2} \cdot \overline{u_{-1}}$ | Twice of fundamental period | |
| $u_{-1} \cdot \overline{u_{+2}}$, $u_{+2} \cdot \overline{u_{-1}}$, $u_{-1} \cdot \overline{u_{+2}}$, $u_{+2} \cdot \overline{u_{-1}}$ | ⅔ times of fundamental period | |
| $u_0 \cdot \overline{u_{+2}}$, $u_{+2} \cdot \overline{u_0}$, $u_0 \cdot \overline{u_{-2}}$, $u_{-2} \cdot \overline{u_0}$ | Fundamental period | |
| $u_{-2} \cdot \overline{u_{+2}}$, $u_{+2} \cdot \overline{u_{+2}}$ | Half of fundamental period | |

As explained above, the period of interference fringes formed by the 0th order diffracted light and the +1st order diffracted light and the period of interference fringes formed by the 0th order diffracted light and the −1st order diffracted light are twice the fundamental period P. Therefore, their effects can be removed by the above-described configuration.

The period of interference fringes formed by the +1st order diffracted light and the +2nd order diffracted light and the period of interference fringes formed by the −1st order diffracted light and the −2nd order diffracted light are twice the fundamental period P. Therefore, their effects can be removed by the above-described configuration.

The period of interference fringes formed by the −1st order diffracted light and the +2nd order diffracted light and the period of interference fringes formed by the +1st order diffracted light and the −2nd order diffracted light are two thirds of the fundamental period P. In this case, the effect of the unnecessary interference light is eventually removed by the arrangement of the light-receiving elements 11A and 11B.

Therefore, according to this configuration, it is possible to remove a part of the effect of the interference fringes formed by the +2nd order and −2nd order diffracted light, i.e., the effect of the interference fringes that have a period twice the fundamental period P and a period that is two thirds of the fundamental period P.

Meanwhile, the interference fringes formed by the −2nd order and +2nd order diffracted light have a period that is a half of the fundamental period P and the effect of the interference fringes remain without being removed. However, since the optical intensities of the −2nd order and +2nd order diffracted light is significantly smaller than that of the 0th order diffracted light, the −1st order diffracted light, and the +1st order diffracted light, their effects are relatively small (or negligible). Therefore, as described above, it is possible to sufficiently improve position detection accuracy, without removing the effect of the interference fringes formed by the +2nd order and −2nd order diffracted light, by removing the effect caused by the unnecessary diffracted light having the other orders.

Further, it has been explained that interference components having a period that is two thirds of the fundamental period and a period twice the fundamental period can be removed in the above descriptions. However, by giving consideration to cases where diffracted light having the 3rd order and higher are mixed, it is possible to generalize such that interference components having periods that are 2/(2×n+1) times the fundamental period P among all the formed interference fringes can be removed, where n is an integer no less than zero. That is, according to this configuration, it can be understood that an interference component having a specific period among unnecessary interference components caused by mixed diffracted light having high orders higher than the 1st order can be removed.

As described above, according to this configuration, it is possible to reduce or prevent the effect of unnecessary diffracted light without adding an optical element or the like for removing the unnecessary diffracted light. Therefore, since the physical size of the displacement encoder is not increased, it is advantageous for a reduction in the size of the displacement encoder.

Second Exemplary Embodiment

Figure 14:
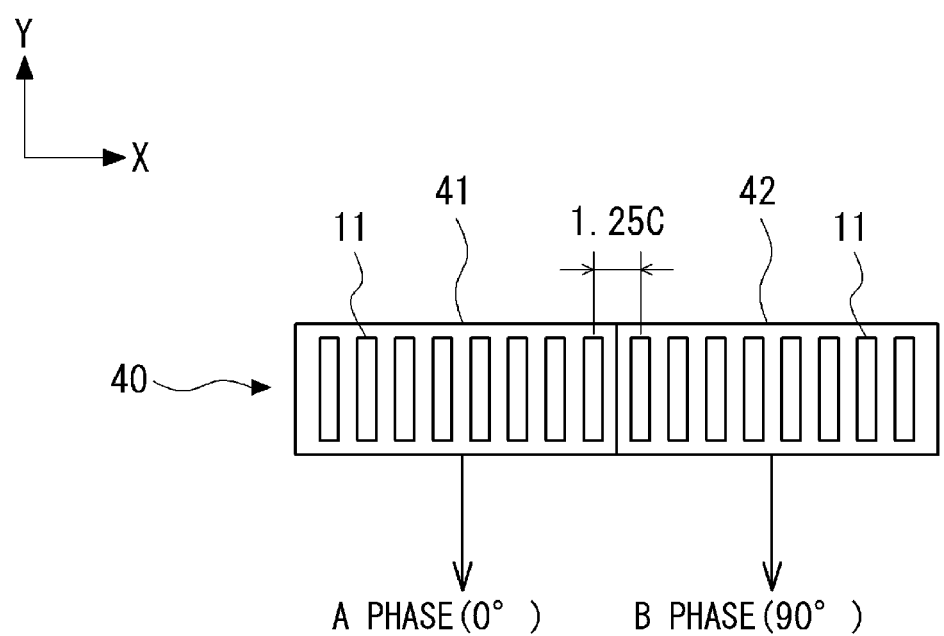
FIG. 14 schematically shows a configuration of a light-receiving unit according to a second exemplary embodiment.

An optical displacement encoder according to a second exemplary embodiment of the present invention is explained. In this exemplary embodiment, a modified example of the light-receiving unit 9 is explained. FIG. 14 schematically shows a configuration of a light-receiving unit according to the second exemplary embodiment. In the light-receiving unit 40, two detection areas 41 and 42 are arranged in the X-direction. Note that the detection areas 41 and 42 are also referred to as first and second light-receiving units, respectively.

Each of the detection areas 41 and 42 has a configuration similar to that of the light-receiving unit 9 according to the first exemplary embodiment. However, the light-receiving elements of the detection area 42 are shifted from those of the detection area 41 in the X-direction by a distance equivalent of a quarter of the fundamental period P. That is, the detection areas 41 and 42 are shifted from each other in the X-direction by a distance equivalent of a quarter of the fundamental period P so as to be apart from each other in the X-direction. In this case, the distance between the nearest light-receiving elements in the connection part between the detection areas 41 and 42 is 1.25 C.

According to this configuration, the detection area 41 can output an A phase signal (0°) and the detection area 42 can output a B phase signal (90°). By generating a phase difference signal as described above, it is possible to achieve more accurate position detection.

Figure 15:
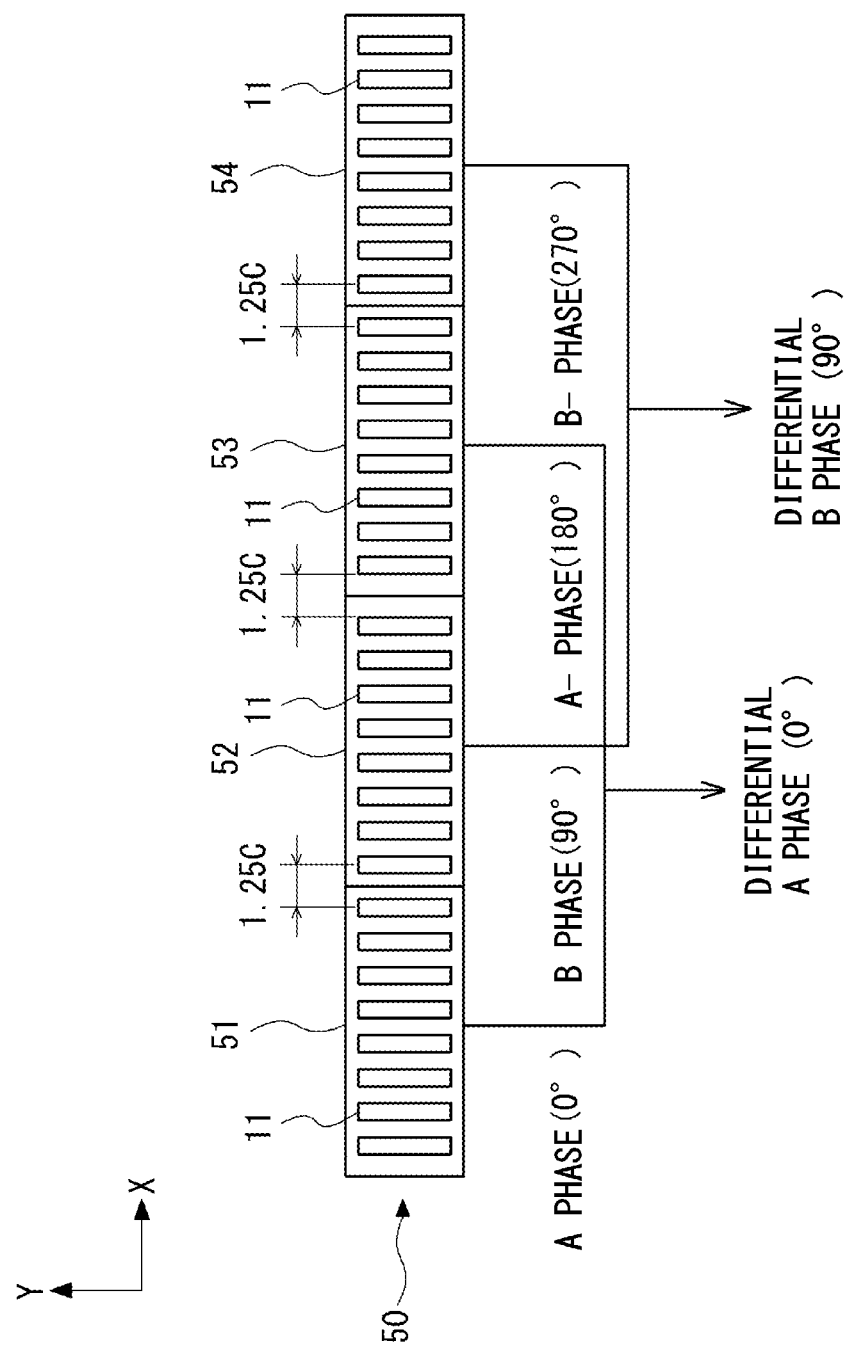
FIG. 15 schematically shows another configuration of a light-receiving unit according to the second exemplary embodiment.

Further, another example of the configuration of the light-receiving unit is explained. FIG. 15 schematically shows another configuration of the light-receiving unit according to the second exemplary embodiment. In the light-receiving unit 50, four detection areas 51 to 54 are arranged in this order in the X-direction. Each of the detection areas 51 to 54 has a configuration similar to that of the light-receiving unit 9 according to the first exemplary embodiment. Note that the detection areas 51 to 54 are also referred to as first to fourth light-receiving units, respectively.

The light-receiving elements of the detection area 52 are shifted from those of the detection area 51 in the X-direction by a distance equivalent of a quarter of the fundamental period P. The light-receiving elements of the detection area 53 are shifted from those of the detection area 52 in the X-direction by a distance equivalent of a quarter of the fundamental period P. The light-receiving elements of the detection area 54 are shifted from those of the detection area 53 in the X-direction by a distance equivalent of a quarter of the fundamental period P. That is, the detection areas 51 to 54 are arranged so that two neighboring light-receiving units are shifted from each other in the X-direction by a distance equivalent of a quarter of the fundamental period P so as to be apart from each other in the X-direction. In this case, the distance between the nearest light-receiving elements in the connection part between two neighboring light-receiving units is 1.25 C.

According to this configuration, the detection areas 51, 52, 53 and 54 can output an A phase signal (0°), a B phase signal (90°), an A− phase signal (180°), and a B− phase signal (270°), respectively. In this way, it is possible to generate a differential A phase signal from the A phase signal (0°) and the A− phase signal (180°), and generate a differential B phase signal from the B phase signal (90°) and the B− phase signal (270°). By generating a phase difference signal as described above, it is possible to achieve more accurate position detection.

Figure 16:
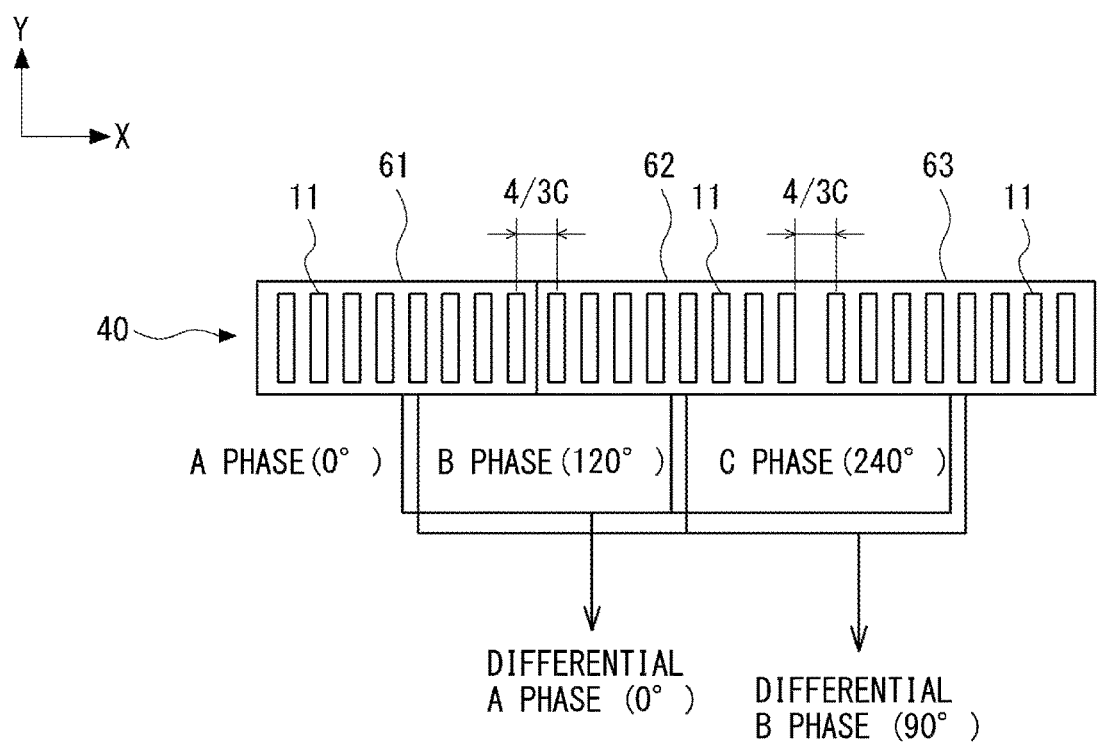
FIG. 16 schematically shows another configuration of a light-receiving unit according to the second exemplary embodiment.

Further, another example of the configuration of the light-receiving unit is explained. FIG. 16 schematically shows another configuration of the light-receiving unit according to the second exemplary embodiment. In the light-receiving unit 60, three detection areas 61 to 63 are arranged in this order in the X-direction. Each of the detection areas 61 to 63 has a configuration similar to that of the light-receiving unit 9 according to the first exemplary embodiment. Note that the detection areas 61 to 63 are also referred to as first to third light-receiving units, respectively.

The light-receiving elements of the detection area 62 are shifted from those of the detection area 61 in the X-direction by a distance equivalent of one third of the fundamental period P. The light-receiving elements of the detection area 63 are shifted from those of the detection area 62 in the X-direction by a distance equivalent of one third of the fundamental period P. That is, the detection areas 61 to 64 are arranged so that two neighboring light-receiving units are shifted from each other in the X-direction by a distance equivalent of one third of the fundamental period P so as to be apart from each other in the X-direction. In this case, the distance between the nearest light-receiving elements in the connection part between two neighboring light-receiving units is 4/3 C (i.e., 1.3333 . . . C).

According to this configuration, the detection areas 61, 62 and 63 can output an A phase signal (0°), a B phase signal (120°), and a C phase signal (240°), respectively. In this way, it is possible to generate a differential A phase signal (0°) and a differential B phase signal (90°) by combining the three-phase signals and thereby to achieve more accurate position detection.

Third Exemplary Embodiment

Figure 17:
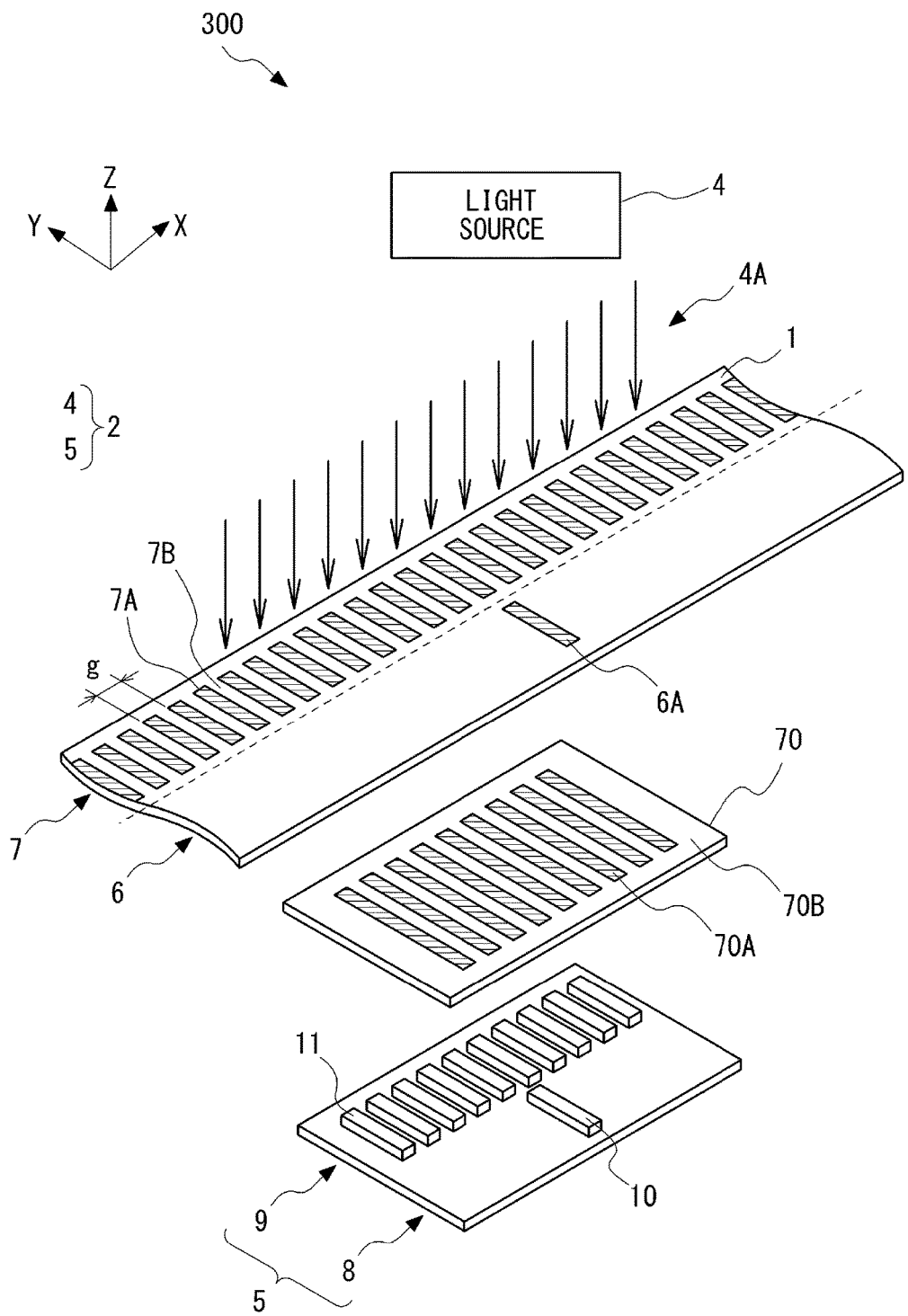
FIG. 17 is a perspective view showing a configuration of an optical displacement encoder according to a third exemplary embodiment.

Next, an optical displacement encoder according to a third exemplary embodiment will be described. FIG. 17 is a perspective view showing a configuration of an optical displacement encoder 300 according to the third exemplary embodiment. Here, the optical displacement encoder 300 is configured as a transmission-type displacement encoder.

As shown in FIG. 17, the optical displacement encoder 300 has the configuration in which an optical element 70 is added to the optical displacement encoder 100 according to the first exemplary embodiment. The optical element 70 is configured to receive the diffracted lights including at least +1st order diffracted light, −1st order diffracted light, and 0th order diffracted light, and to guide the received diffracted lights to the light-receiving unit 9 of the detection unit 5. In other words, the optical element 70 is configured to condense the received diffracted light on the detection unit 5 in such a manner that the +1st order diffracted light and −1st order diffracted light form the interference fringes 20 on the light-receiving unit 9. In FIG. 17, as an example, the optical element 70 is represented as a diffraction grating. In the optical element 70, light-transmitting parts 70A elongated in the Y-axis direction are periodically arranged in the X-axis direction on a plate-like member 70B that has a principal plane parallel to the X-Y plane. However, it should be appreciated that various optical elements capable of condensing the diffracted light on the light-receiving unit 9 may be used as the optical element 70.

Figure 18:
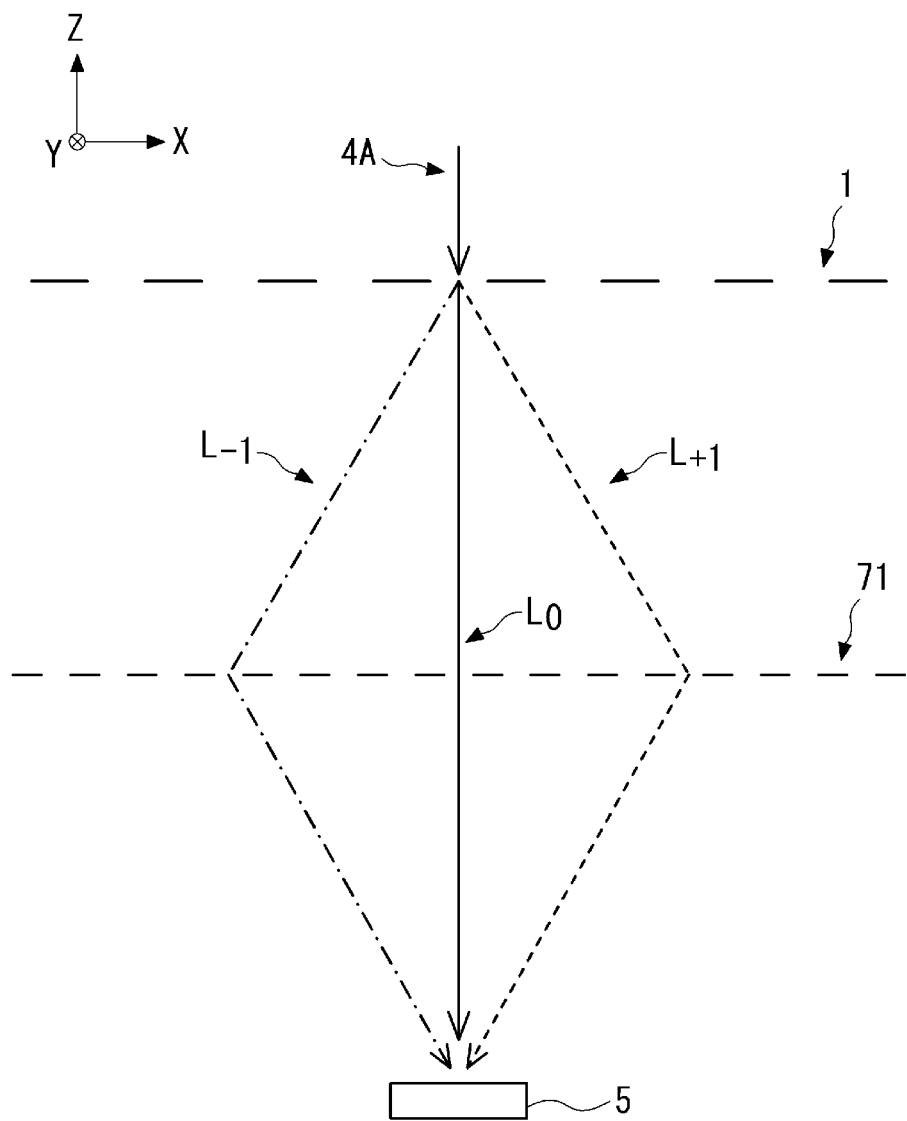
FIG. 18 shows an example of the optical element according to the third embodiment.

FIG. 18 shows an example of the optical element according to the third embodiment. As shown in FIG. 18, a diffraction grating 71 is disposed as the optical element. The diffraction grating 71 has the same configuration as the optical element 70 configured as the diffraction grating. The diffraction grating 71 further diffracts the +1st order diffracted light L+1 and −1st order diffracted light L−1 to the detection unit 5 to form the interference fringes 20. Various grating including an amplitude grating and a phase grating may be used as the diffraction grating 71.

Figure 19:
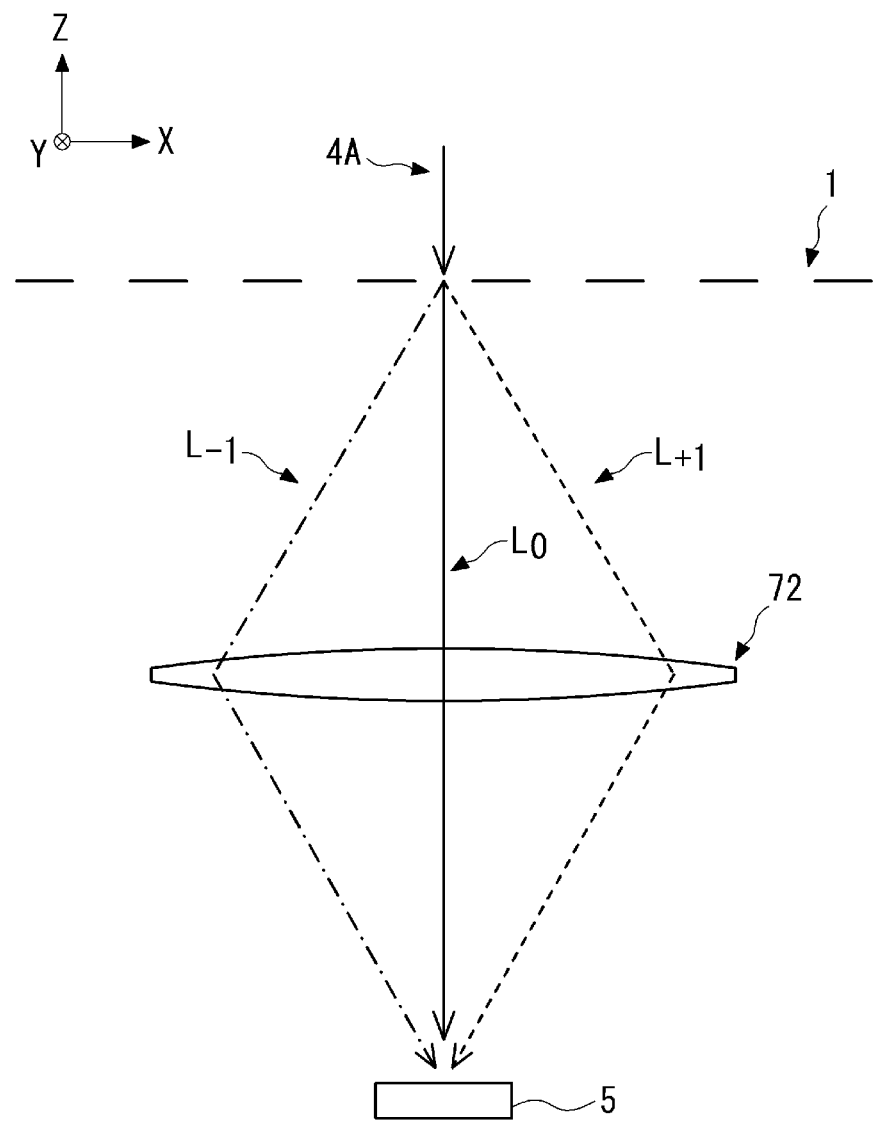
FIG. 19 shows another example of the optical element according to the third embodiment.

FIG. 19 shows another example of the optical element according to the third embodiment. As shown in FIG. 19, a lens 72 is disposed as the optical element. The lens 72 condenses the +1st order diffracted light L+1 and −1st order diffracted light L−1 on the detection unit 5 to form the interference fringes 20. Various lens such as an aspherical lens may be used as the lens 72. Note that the lens 72 is merely an example of the optical element. As long as the +1st order diffracted light L+1 and −1st order diffracted light L−1 can be condensed on the detection unit 5, an optical system including two or more lenses may be also adopted. For example, a doubly telecentric lens system (double lens, 4f design) or a double-double telecentric lens system may be adopted.

Figure 20:
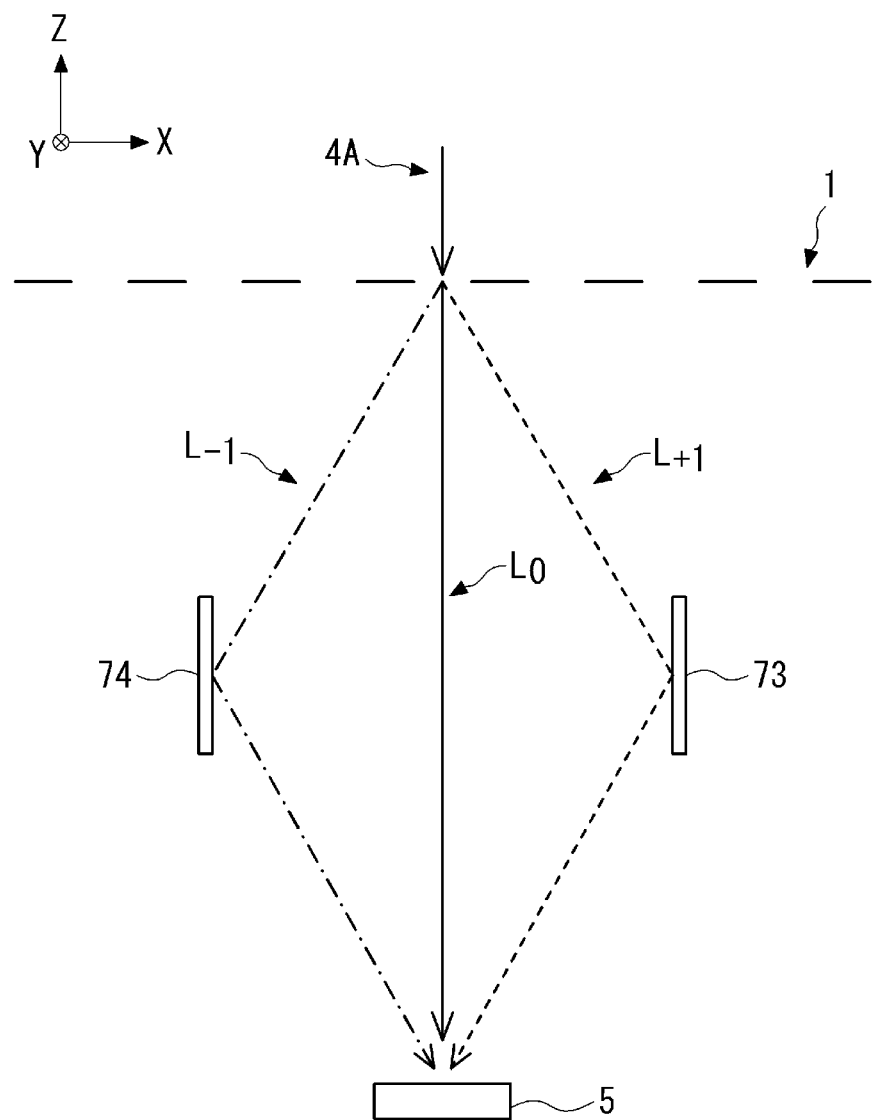
FIG. 20 shows another example of the optical element according to the third embodiment.

FIG. 20 shows another example of the optical element according to the third embodiment. As shown in FIG. 20, mirrors 73 and 74 are disposed as the optical element. The mirrors 73 and 74 are desirably disposed symmetrically with respect to an optical axis of the optical displacement encoder 300, which passes through a center of the light source and a center of the detection unit 5 and is parallel to a Z direction, so as to face each other. The mirror 73 reflects the +1st order diffracted light L+1 transmitted from the scale 1 to the detection unit 5, and the mirror 74 reflects the −1st order diffracted light L−1 transmitted from the scale 1 to the detection unit 5. Thus, the reflected diffracted lights can form the interference fringes 20 on the detection unit 5. The arrangement of the mirrors may not be limited to the present arrangement. Other arrangements may be adopted as long as the diffracted lights are appropriately guided to the detection unit 5.

In the examples shown in FIGS. 18 to 20, the 0th order diffracted light L0 also reaches the detection unit 5 through the optical element. However, it should be appreciated that the effect of the 0th order diffracted light L0 can be appropriately suppressed or eliminated based on the principle explained in the above exemplary embodiment. Therefore, a more compact design can be achieved, because blocking is not a required function for suppression of errors as described above.

As described above, according to this configuration, it is possible to reduce or prevent the effect of unnecessary diffracted light without adding an optical element or the like for removing the unnecessary diffracted light as in the above-described exemplary embodiment.

Fourth Exemplary Embodiment

Figure 21:
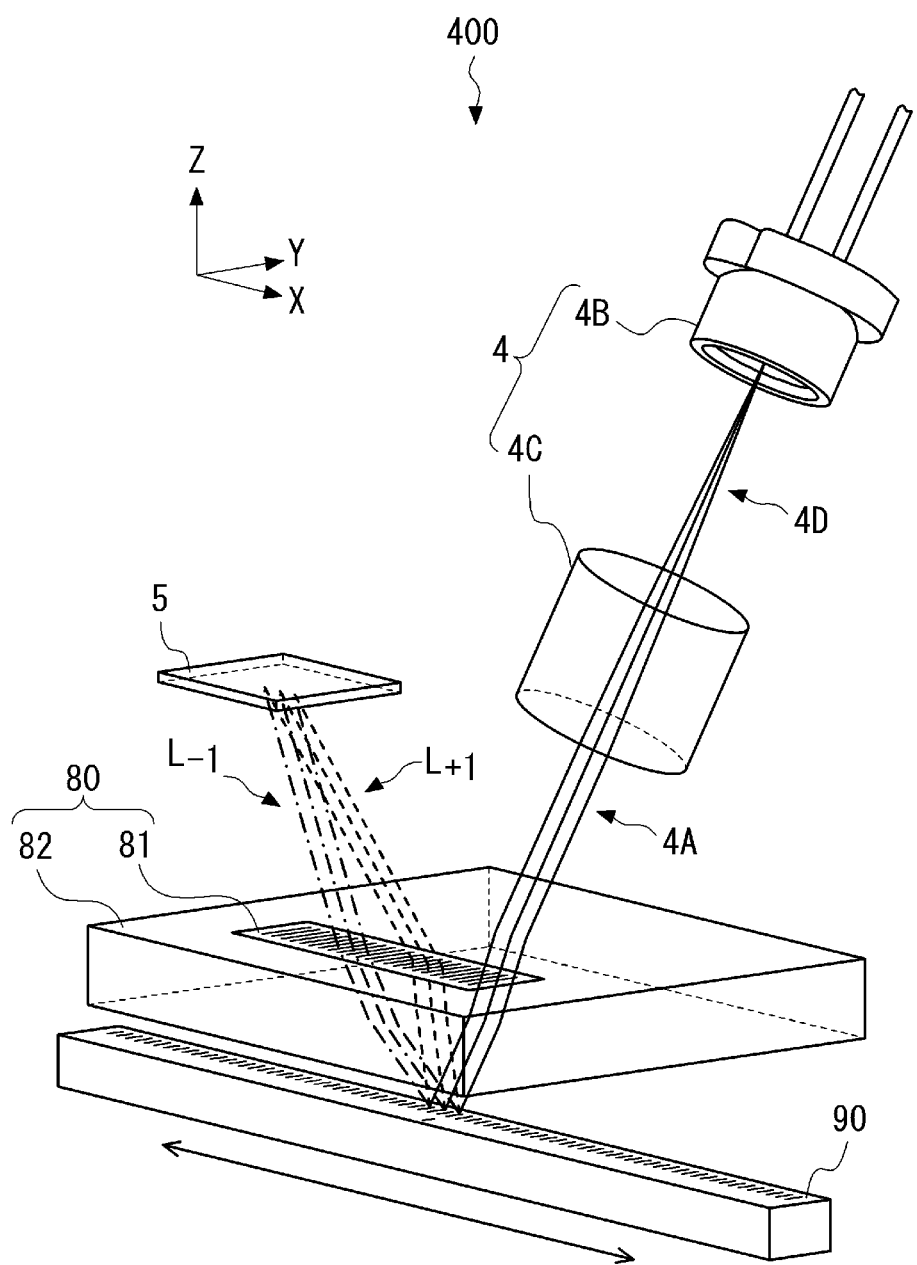
FIG. 21 is a perspective view showing a configuration of an optical displacement encoder according to a fourth exemplary embodiment.
Figure 22:
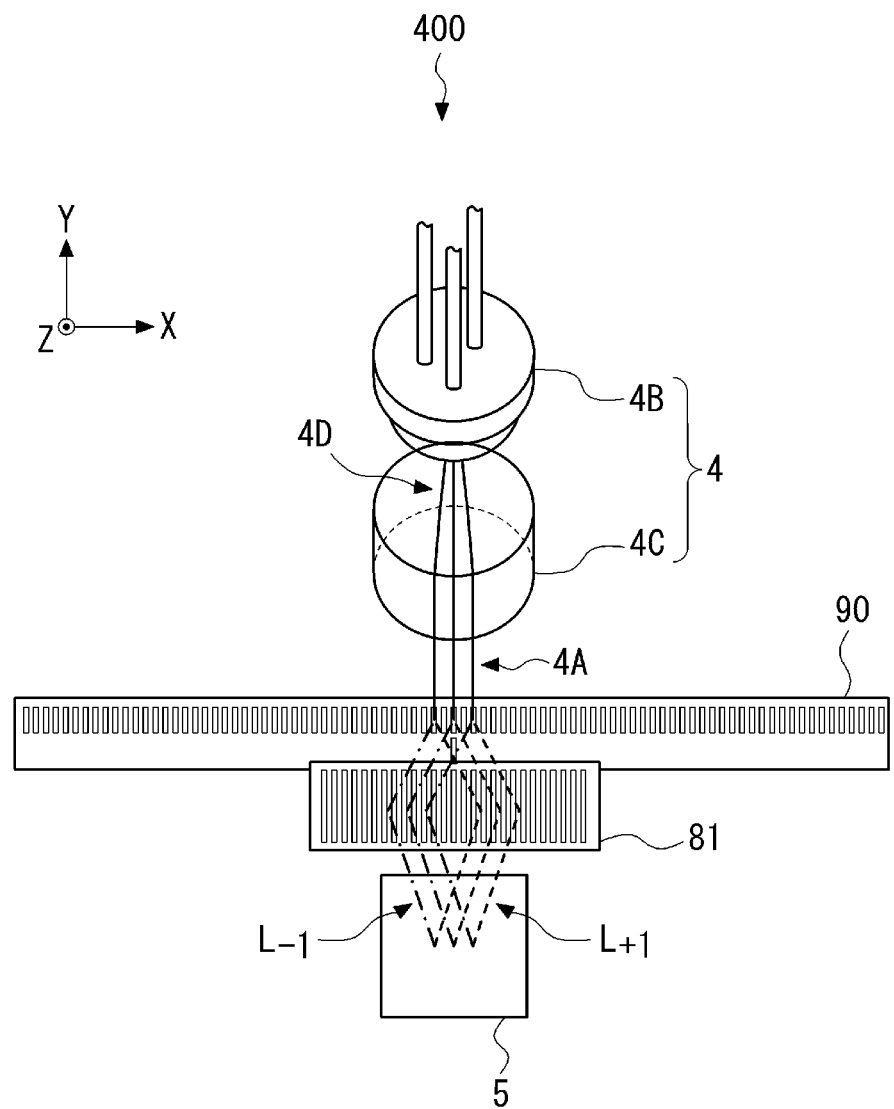
FIG. 22 is a top view showing the configuration of the optical displacement encoder according to the fourth exemplary embodiment.
Figure 23:
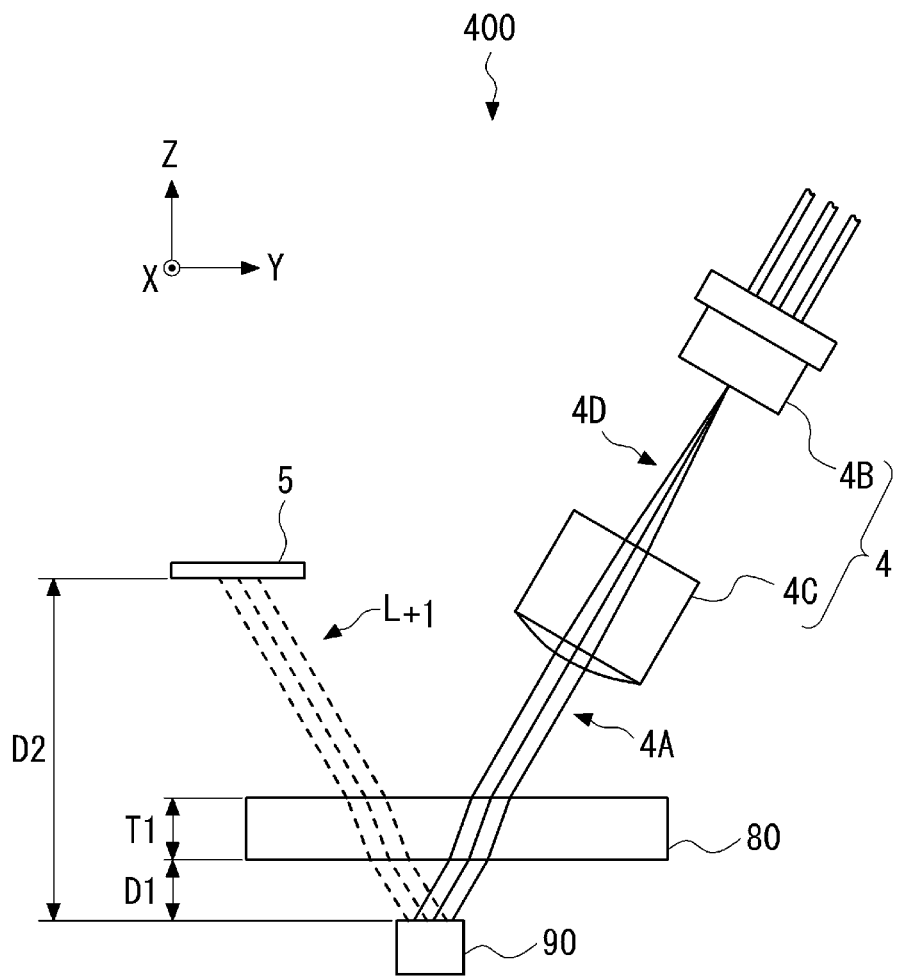
FIG. 23 is a side view showing the configuration of the optical displacement encoder 400 according to the fourth exemplary embodiment when observed along an X-axis direction.
Figure 24:
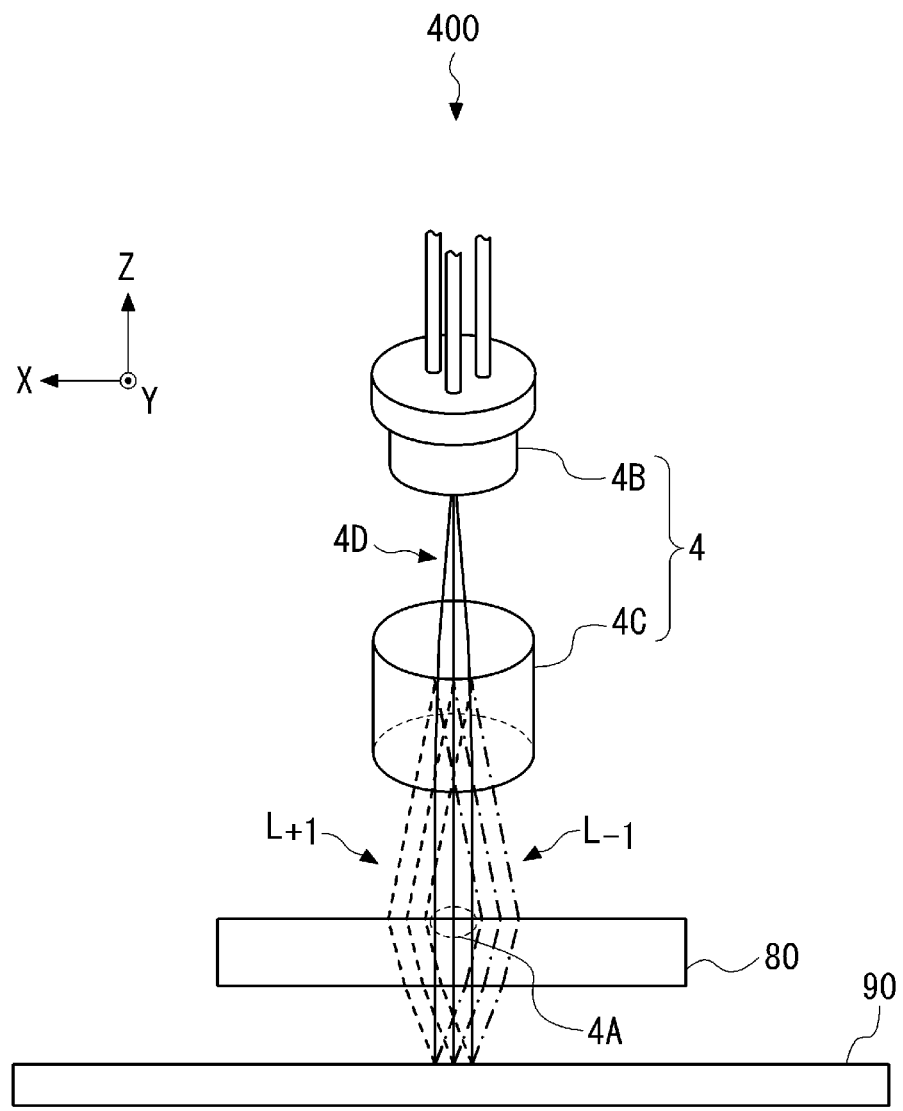
FIG. 24 is a side view showing the configuration of the optical displacement encoder 400 according to the fourth exemplary embodiment when observed along a Y-axis direction.

Next, an optical displacement encoder according to a fourth exemplary embodiment will be described. FIG. 21 is a perspective view showing a configuration of an optical displacement encoder 400 according to the fourth exemplary embodiment. FIG. 22 is a top view showing the configuration of the optical displacement encoder 400 according to the fourth exemplary embodiment. FIG. 23 is a side view showing the configuration of the optical displacement encoder 400 according to the fourth exemplary embodiment when observed along the X-axis direction. FIG. 24 is a side view showing the configuration of the optical displacement encoder 400 according to the fourth exemplary embodiment when observed along the Y-axis direction.

As compared to the optical displacement encoder 300, the optical displacement encoder 400 has a configuration in which the scale 1 and the optical element 70 are replaced with a scale 90 and optical element 80, respectively, and the arrangement of the components therein is changed.

In the present configuration, the optical displacement encoder 400 is configured as a reflection-type displacement encoder. The light source 4 and the detection unit 5 are disposed to face one surface (the top surface in FIG. 21) of the optical element 80, and the scale 90 is disposed to face the other surface (the bottom surface in FIG. 21) of the optical element 80.

In FIGS. 21 to 24, for representing the path of the light, the collimated light 4A, a laser light 4D, the +1st order diffracted light $L_{+1}$ and −1st order diffracted light $L_{-1}$ are represented by the three lines. Here, the three lines in FIGS. 21, 22 and 24 are represented to be separated in the X-axis direction, and the three lines in FIG. 23 are represented to be separated in the Y-axis direction. Note that the +1st order diffracted light $L_{+1}$ and −1st order diffracted light $L_{-1}$ overlap when observed from along the X-direction. Therefore, for simplicity, only the +1st order diffracted light $L_{+1}$ is represented in FIG. 23.

In the present exemplary embodiment, the collimated light 4A output from the light source 4 is incident on the scale 90. In the present exemplary embodiment, the light source 4 includes a semiconductor laser 4B and a collimating lens 4C. The semiconductor laser 4B outputs a laser light 4D to the collimating lens 4C. In FIG. 21, the semiconductor laser 4B is represented as a CAN package in which a semiconductor laser diode outputting the laser light 4D is mounted. The wavelength of the laser light 4D may be, for example, 660 nm. The collimating lens 4C collimates the laser light 4D and outputs the collimated light 4A to the scale 90.

Since the optical displacement encoder 400 is configured as a reflection-type displacement encoder, the light source 4 is disposed in such a manner that the collimated light 4A is incident on the scale 90 in a direction tilted with respect to the surface of the scale 90. In the example of FIGS. 21 to 24, the collimated light 4A is incident on the scale 90 in the direction tilted with respect to the surface of the scale 90 in the Y-Z plane by a predetermined angle. Note that the incident direction of the collimated light 4A in FIGS. 21 to 24 is merely an example and another direction may be selected as the incident direction. Therefore, the paths of the +1st order diffracted light $L_{+1}$ and −1st order diffracted light $L_{-1}$ do not overlap with the path of the collimated light 4A and the detection unit 5 can appropriately receive the diffracted lights without interfering with the light source 4.

The scale 90 is configured as a reflection-type grating. The pitch $P_s$ of the incremental pattern of the scale 90 may be, for example, 2 µm. The collimated light 4A incident on the scale 90 is diffracted and reflected by the scale 90.

The optical element 80 is configured and disposed to receive the diffracted lights that includes at least +1st order diffracted light, −1st order diffracted light, and 0th order diffracted light, and to guide the received diffracted lights on the light-receiving unit 9 of the detection unit 5. In other words, the optical element 80 is configured to condense the received diffracted light on the detection unit 5 in such a manner that the +1st order diffracted light and −1st order diffracted light form the interference fringes 20 on the detection unit 5.

A configuration of the optical element 80 will be described. The optical element 80 is configured as a transmission-type grating. The optical element 80 includes a periodic pattern 81 and a transparent substrate 82. The transparent substrate 82 is a plate-like member formed by transparent material such as glass or synthetic quartz and has a principal plane parallel to the X-Y plane. Further, for simplicity, the transparent substrate 82 is omitted in FIG. 22.

The distance D1 in the Z-axis direction between the top surface of the scale 90 and the bottom surface of the transparent substrate 82 may be, for example, 2.5 mm. The thickness T1 of the transparent substrate 82 in the Z-direction may be, for example, 2.286 mm (or 0.09 inch). The distance D2 in the Z-axis direction between the top surface of the scale 90 and the light-receiving surface of the detection unit 5 may be, for example, 13.28 mm.

The periodic pattern 81 is formed on the top surface of the transparent substrate 82 that faces the light source 4 and the detection unit 5. The periodic pattern 81 may be formed as a phase grating. In this case, the grooves elongated along the Y-axis direction and periodically arranged along the X-axis direction constitute the periodic pattern 81. The periodic grooves may be formed by general photolithography and etching (e.g. dry etching such as RIE [Reactive Ion Etching]). The pitch $P_i$ of the periodic grooves may be, for example, 4/3 µm (1.333 . . . µm).

The pitch $P_f$ of the interference fringes 20 can be defined by the following expression.

$$P_f = \frac{P_i P_s}{2(P_s - P_i)}$$

When $P_s$ is 2 μm and $P_i$ is 4/3 μm (1.333 ... μm), the pitch $P_f$ is 2 μm.

As described above, according to this configuration, it is possible to reduce or prevent the effect of unnecessary diffracted light without adding an optical element or the like for removing the unnecessary diffracted light as in the above-described exemplary embodiment.

The optical element 80 may not be limited to the diffraction grating. Various optical elements such as the lens and the mirrors described in the third exemplary embodiment may be used as the optical element 80.

Fifth Exemplary Embodiment

Figure 25:
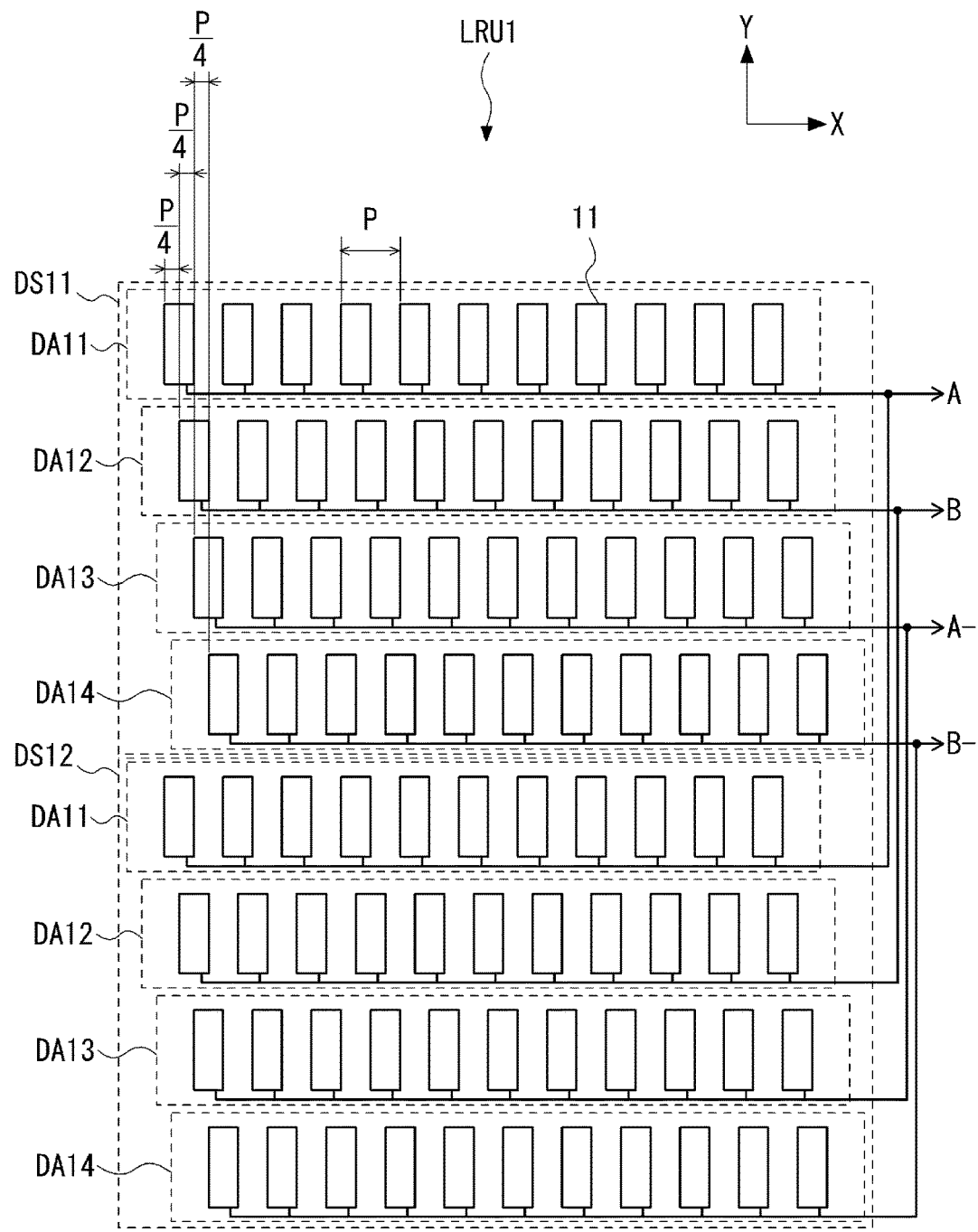
FIG. 25 schematically shows a configuration of a light-receiving unit LRU1 according to a fifth exemplary embodiment.

In this exemplary embodiment, a modified example of the light-receiving unit 9 according to the above-described exemplary embodiments will be described. FIG. 25 schematically shows a configuration of a light-receiving unit LRU1 according to the fifth exemplary embodiment. The light-receiving unit LRU1 includes a plurality of detection sequences DS arranged in the Y-direction. In this example, for simplicity, the light-receiving unit LRU1 that includes two detection sequences DS arranged in the Y-direction will be described. In FIG. 25, DS11 denotes one of the two detection sequences DS and DS12 denotes the other of the two detection sequences DS. It should be appreciated that three or more detection areas may be arranged in the Y-direction in the light-receiving unit LRU1.

Each detection sequence DS includes a plurality of detection areas. In this exemplary embodiment, a four-phase configuration in which four detection areas DA11 to DA14 are disposed will be described. The detection areas DA11 to DA14 are configured to provide the A, B, A−, and B− phase signals, respectively. It should be appreciated that two (a two-phase configuration), three (a three-phase configuration), five, or more detection areas may be disposed in each detection area.

Each of the detection areas DA11 to DA14 has a configuration similar to that of the light-receiving unit 9 according to the first exemplary embodiment. While the detection areas DA11 to DA14 are arranged in the Y-direction, the detection areas DA11 to DA14 are respectively shifted by a quarter of the fundamental period P (i.e. P/4) to provide the four-phase configuration.

Specifically, the light-receiving elements 11 in the detection area DA12 are shifted in the X-direction by P/4 with respect to the light-receiving elements 11 in the detection area DA11. The light-receiving elements 11 in the detection area DA13 are shifted in the X-direction by P/4 with respect to the light-receiving elements 11 in the detection area DA12. The light-receiving elements 11 in the detection area DA14 are shifted in the X-direction by P/4 with respect to the light-receiving elements 11 in the detection area DA13.

The light-receiving elements 11 in the detection area DA11 are connected to each other to combine the output signals and the combined signal is output as the A phase signal. The light-receiving elements 11 in the detection area DA12 are connected to each other to combine the output signals and the combined signal is output as the B phase signal. The light-receiving elements 11 in the detection area DA13 are connected to each other to combine the output signals and the combined signal is output as the A− phase signal. The light-receiving elements 11 in the detection area DA14 are connected to each other to combine the output signals and the combined signal is output as the B− phase signal.

The same phase signals output from the detection sequences DS11 and DS12 are combined and the combined phase signal is output to the signal processing unit 3. Specifically, the A phase signals output from the detection sequences DS11 and DS12 are combined and the combined A phase signal is output to the signal processing unit 3. The B phase signals output from the detection sequences DS11 and DS12 are combined and the combined B phase signal is output to the signal processing unit 3. The A− phase signals output from the detection sequences DS11 and DS12 are combined and the combined A− phase signal is output to the signal processing unit 3. The B− phase signals output from the detection sequences DS11 and DS12 are combined and the combined B− phase signal is output to the signal processing unit 3.

According to this configuration, the detection areas DA11 to DA14 can output the A phase signal (0°), the B phase signal (90°), the A− phase signal (180°), and the B− phase signal (270°), respectively. Therefore, it is possible to generate the phase difference signal and to achieve more accurate position detection as in the second exemplary embodiment.

Additionally, since the detection areas are arranged in the Y-direction traverse to the measurement direction (i.e. the X-direction), even when there are any detection areas that are contaminated or have defects, the other detection areas that are not contaminated or do not have the defects can compensate unwanted effects due to the contamination or defects. Therefore, accuracy of the output signal of the light-receiving unit can be appropriately maintained.

Figure 26:
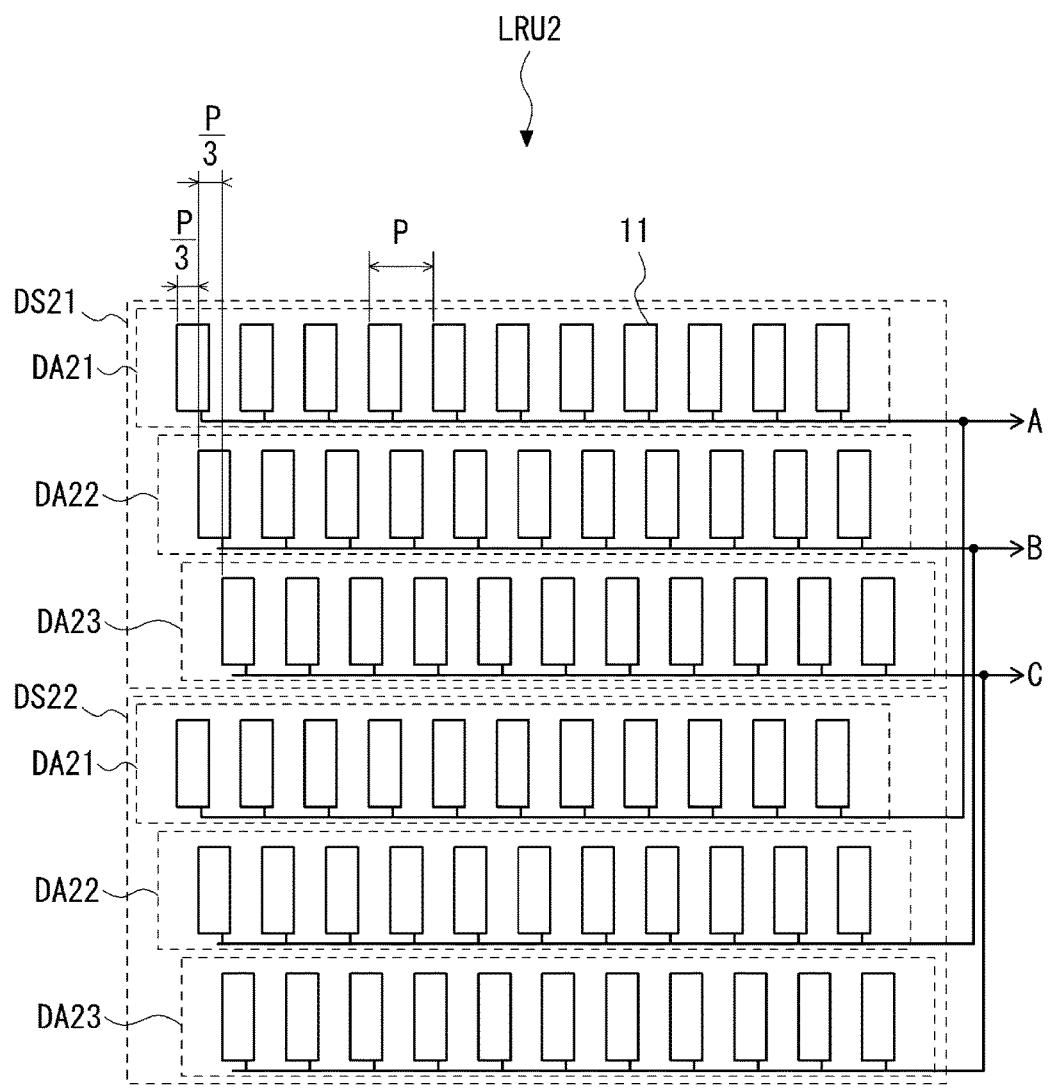
FIG. 26 schematically shows another configuration of a light-receiving unit LRU2 according to the fifth exemplary embodiment.

Subsequently, another configuration of the light-receiving unit will be described. FIG. 26 schematically shows another configuration of a light-receiving unit LRU2 according to the fifth exemplary embodiment. In this example, the light-receiving unit LRU2 has the three-phase configuration.

The light-receiving unit LRU2 has a configuration in which the detection sequences DS11 and DS12 of the light-receiving unit LRU1 are respectively replaced with detection sequences DS21 and DS22.

Each of the detection sequences DS21 and DS22 includes three detection areas DA21 to DA23. The detection areas DA21 to DA23 are configured to provide the A, B, and C phase signals, respectively.

Each of the detection areas DA21 to DA23 has a configuration similar to that of each the detection areas DA11 to DA14 except for an arrangement pitch of the light-receiving elements 11. While the detection areas DA21 to DA23 are arranged in the Y-direction, the detection areas DA21 to DA23 are respectively shifted by one third of the fundamental period P (P/3) to provide the three-phase configuration.

Thus, the light-receiving elements 11 in the detection area DA22 are shifted in the X-direction by P/3 with respect to the light-receiving elements 11 in the detection area DA21. The light-receiving elements 11 in the detection area DA23 are shifted in the X-direction by P/3 with respect to the light-receiving elements 11 in the detection area DA22.

The light-receiving elements 11 in the detection area DA21 are connected to each other to combine the output signals and the combined signal is output as the A phase signal. The light-receiving elements 11 in the detection area DA22 are connected to each other to combine the output signals and the combined signal is output as the B phase signal. The light-receiving elements 11 in the detection area DA23 are connected to each other to combine the output signals and the combined signal is output as the C phase signal.

The same phase signals output from the detection sequences DS21 and DS22 are combined and the combined phase signal is output to the signal processing unit 3. Specifically, the A phase signals output from the detection sequences DS21 and DS22 are combined and the combined A phase signal is output to the signal processing unit 3. The B phase signals output from the detection sequences DS21 and DS22 are combined and the combined B phase signal is output to the signal processing unit 3. The C phase signals output from the detection sequences DS21 and DS22 are combined and the combined C phase signal is output to the signal processing unit 3.

According to this configuration, the detection areas DA21 to DA23 can output the A phase signal (0°), the B phase signal (120°), and the C phase signal (240°), respectively. Therefore, it is possible to generate the phase difference signal and to achieve more accurate position detection as in the case of the light-receiving unit LRU1.

Additionally, as in the case of the light-receiving unit LRU1, accuracy of the output signal of the light-receiving unit can be appropriately maintained.

Note that it is possible to achieve a light-receiving unit corresponding to a multi-phase signal by modifying the light-receiving units described in this exemplary embodiment. Specifically, a light receiving unit capable of a k-phase signal can be achieved, where k is an integer equal to or more than two. In this case, in one detection area, k detection areas in which the light-receiving elements are arranged in the measurement direction (the X-direction) with the pitch P may be arranged in the direction (the Y-direction) traverse to the measurement direction (the X-direction), and the k detection areas are shifted with respect to each other by a pitch of P/k in the measurement direction (the X-direction).

Sixth Exemplary Embodiment

In this exemplary embodiment, modified examples of the light-receiving units LRU1 and LRU2 according to the fifth exemplary embodiment will be described.

Figure 27:
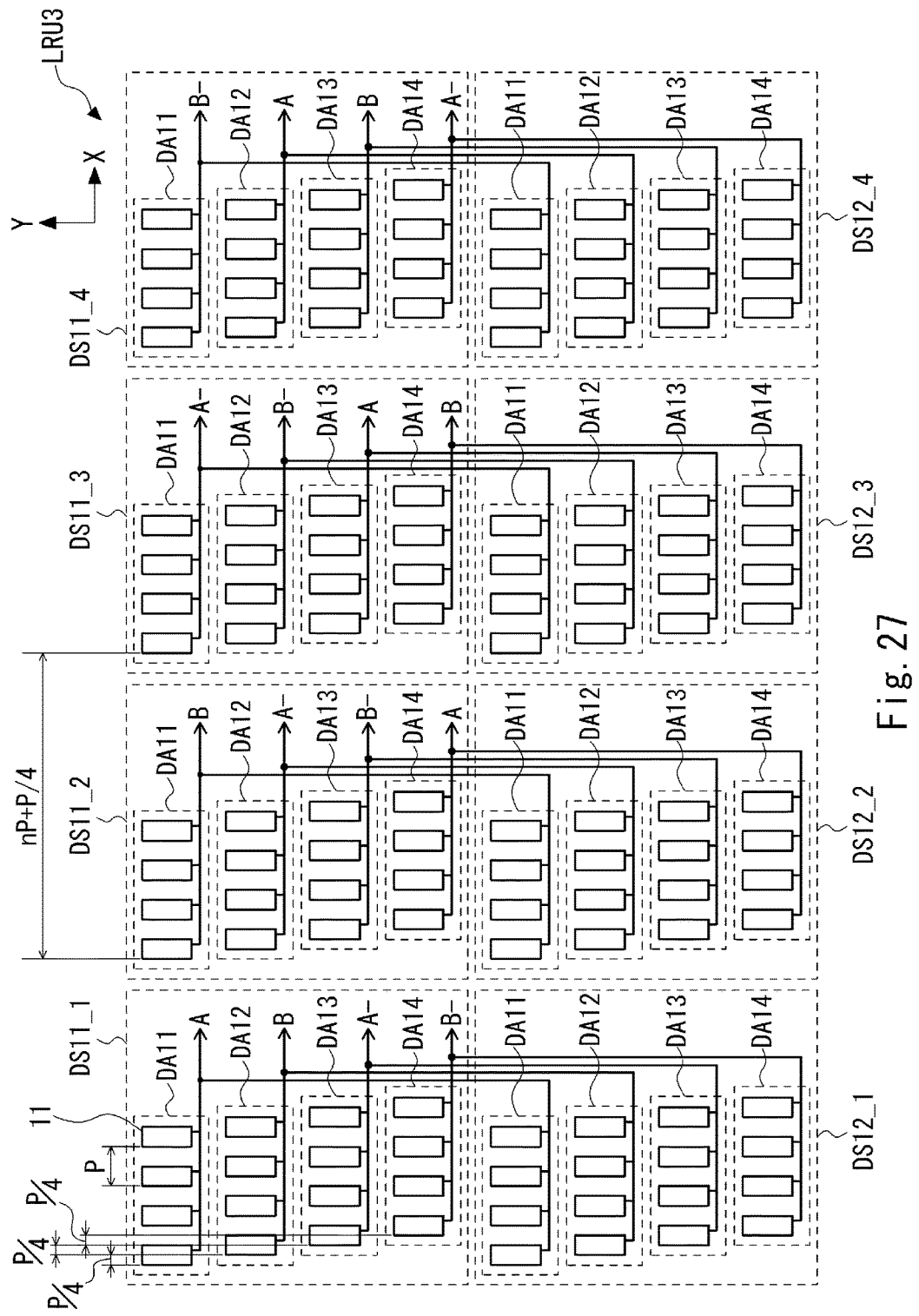
FIG. 27 schematically shows a configuration of a light-receiving unit LRU3 according to a sixth exemplary embodiment.

FIG. 27 schematically shows a configuration of a light-receiving unit LRU3 according to the sixth exemplary embodiment. The light-receiving unit LRU3 is a modified example of the LRU1. Thus, the light-receiving unit LRU3 is configured to have the four-phase configuration.

In the light-receiving unit LRU3, four detection sequences DS11 are arranged in the X-direction with a pitch of nP+P/4, where n is an integer equal to or more than one, and four detection sequences DS12 are arranged in the X-direction with the pitch of nP+P/4. In this example, DS11_1 to DS11_4 denote the four detection sequences DS11 arranged from a left side to a right side along the X-direction in the drawing, respectively. DS12_1 to DS12_4 denote the four detection sequences DS12 arranged from the left side to the right side along the X-direction in the drawing, respectively.

The detection sequence DS11_1 outputs the A, B, A−, and B− phase signals in the same manner as the detection sequence DS11 in the light-receiving unit LRU1.

In this configuration, since two adjacent detection areas are substantially shifted by nP+P/4 in the X-direction, the phase corresponding to the light-receiving elements 11 in one of the two adjacent detection areas is substantially shifted by 90° with respect to the phase corresponding to the light-receiving elements 11 in the other of the two adjacent detection areas.

Therefore, the detection areas DA11 in the detection sequences DS11_1 to DS11_4 output the A, B, A−, and B− phase signals, respectively. The detection areas DA12 in the detection sequences DS11_1 to DS11_4 output the B, A−, B−, and A phase signals, respectively. The detection areas DA13 in the detection sequences DS11_1 to DS11_4 output the A−, B−, A, and B phase signals, respectively. The detection areas DA14 in the detection sequences DS11_1 to DS11_4 output the B−, A, B, and A− phase signals, respectively. The same phase signals output from the detection sequences DS11_1 to DS11_4 are combined and the combined signals are output to the signal processing unit 3.

Because the principle of the detection sequences DS11_1 to DS11_4 can be also applied to the detection sequences DS12_1 to DS12_4, descriptions of the detection sequences DS12_1 to DS12_4 will be omitted.

According to this configuration, as compared to the light-receiving unit LRU1, since the detection areas are further arranged in the measurement direction (i.e. the X-direction), even when there are any detection areas that are contaminated or have defects, the other detection areas that are not contaminated or do not have the defects can compensate unwanted effects of the contamination or defects in the X-direction. Thus, the unwanted effect of the contamination or defects can be further suppressed. Therefore, accuracy of the output signal of the light-receiving unit can be appropriately maintained.

A further improved configuration may be achieved by modifying the light-receiving unit LRU3. In this configuration, the detection sequences DS11_1 to DS11_4 constitute a set for providing the four phase signals and the detection sequences DS12_1 to DS12_4 also constitute a set for providing the four phase signals. Thus, by arranging two or more sets including such four detection areas in the measurement direction (i.e. the X direction), the unwanted effect of the contamination or defects can be further suppressed in the measurement direction (i.e. the X direction).

Figure 28:
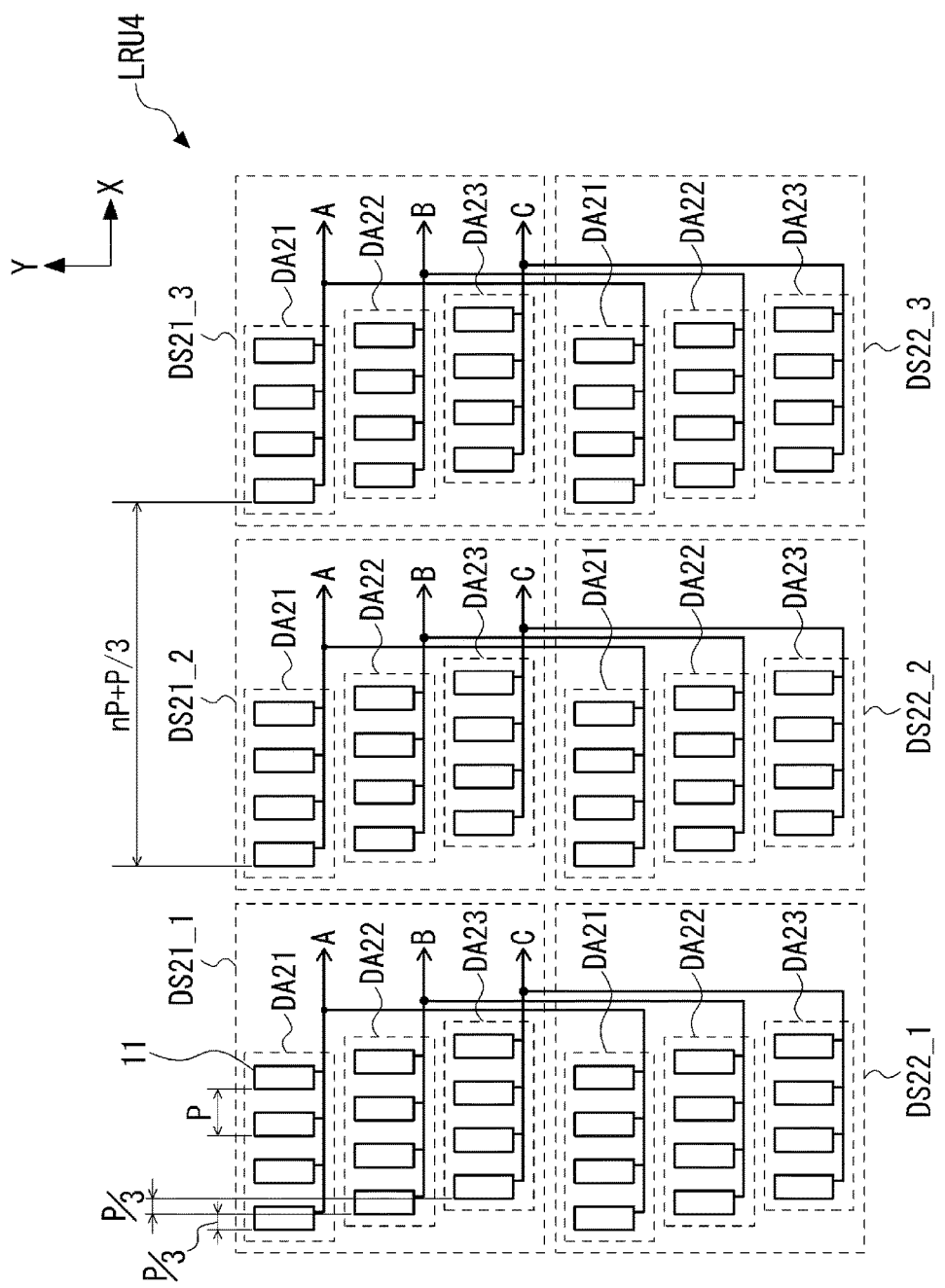
FIG. 28 schematically shows another configuration of a light-receiving unit LRU4 according to the sixth exemplary embodiment.

Subsequently, another configuration of the light-receiving unit will be described. FIG. 28 schematically shows another configuration of a light-receiving unit LRU4 according to the sixth exemplary embodiment. The light-receiving unit LRU4 is a modified example of the light-receiving unit LRU2 that has the three-phase configuration.

In the light-receiving unit LRU4, three detection sequences DS21 are arranged in the X-direction with a pitch of nP+P/3 and three detection sequences DS22 are also arranged in the X-direction with the pitch of nP+P/3. In this example, DS21_1 to DS21_3 denote the three detection sequences DS21 arranged from a left side to a right side along the X-direction in the drawing, respectively. DS22_1 to DS22_3 denote the three detection sequences DS22 arranged from the left side to the right side along the X-direction in the drawing, respectively.

The detection sequence DS21_1 outputs the A, B, and C phase signals in the same manner as the detection sequence DS21 in the light-receiving unit LRU2.

In this configuration, since two adjacent detection areas are shifted by nP+P/3 in the X-direction, the phase corresponding to the light-receiving elements 11 in one of the two adjacent detection areas is substantially shifted by 120° with respect to the phase corresponding to the light-receiving elements 11 in the other of two adjacent detection areas.

Therefore, the detection areas DA21 in the detection sequences D521_1 to D521_3 output the A, B, and C phase signals, respectively. The detection areas DA22 in the detection sequences DS21_1 to D521_3 output the B, C, and A phase signals, respectively. The detection areas DA23 in the detection sequences D521_1 to D521_3 output the C, A, and B phase signals, respectively. The same phase signals output from the detection sequences DS21_1 to D521_3 are combined and the combined signals are output to the signal processing unit 3.

Because the principle of the detection sequences D521_1 to D521_3 can be also applied to the detection sequences DS22_1 to DS22_3, descriptions of the detection sequences DS22_1 to DS22_3 will be omitted.

According to this configuration, as compared to the light-receiving unit LRU2, since the detection areas are further arranged in the measurement direction (i.e. the X-direction), even when there are any detection areas that are contaminated or have defects, the other detection areas that are not contaminated or do not have the defects can compensate unwanted effects of the contamination or defects in the X-direction. Thus, the unwanted effects of the contamination or defects can be further suppressed. Therefore, accuracy of the output signal of the light-receiving unit can be appropriately maintained.

A further improved configuration may be achieved by modifying the light-receiving unit LRU4. In this configuration, the detection sequences DS21_1 to DS21_3 constitute a set for providing the four phase signals and the detection sequences DS22_1 to DS22_3 also constitute a set for providing the four phase signals. Thus, by arranging two or more sets including such four detection areas in the measurement direction (i.e. the X direction), the unwanted effects of the contamination or defects can be further suppressed in the measurement direction (i.e. the X direction).

Note that it is possible to achieve a light-receiving unit corresponding to a multi-phase signal by modifying the light-receiving units described in this exemplary embodiment. Specifically, a light receiving unit capable of a k-phase signal can be achieved, where k is an integer equal to or more than two. In this case, in one detection area, k detection areas in which the light-receiving elements are arranged in the measurement direction (the X-direction) with the pitch of P may be arranged in the direction (the Y-direction) traverse to the measurement direction (the X-direction), and the k detection areas arrange in the Y-direction are shifted each other by a pitch of P/k in the measurement direction (the X-direction), as in the fifth exemplary embodiment.

Further, k detection areas are arranged in the same row in the measurement direction (the X-direction) with a pitch of nP+P/k. In this case, j-th detection area arranged in the X-direction can output a signal having a phase of $2\pi(j-1)/k+\theta_{int}$, where j is an integer equal to or more than two and equal to or less than k ($2<=j<=k$) and $\theta_{int}$ is an initial phase at the first detection area (j=1).

Other Exemplary Embodiments

Note that the present invention is not limited to the aforementioned exemplary embodiments and may be changed as appropriate without departing from the spirit of the present invention. Although the optical displacement encoder 100 is explained as a transmission-type displacement encoder in the above-described exemplary embodiments, it is merely an example. That is, needless to say, the optical displacement encoder 100 can be constructed as a reflection-type displacement encoder.

Further, in the above-described displacement encoder, an index grating for selecting the order of propagating diffracted light may be disposed between the light source and the scale and/or between the scale and the detection unit. Further, an optical device(s) such as a diffraction grating and a lens for forming an image from diffracted light from the scale may be disposed between the scale and the detection unit.

In the exemplary embodiments described above, the configuration generating the A phase signal (0°), the B phase signal (90°), the A− phase signal (180°), and the B− phase signal (270°) has been described. However, the order of the phases (channels) may be changed, so that so some are shifted +¼, others +½ or −½, and others −¼. For example, an order (A A− B B−) would have steps (½, −¼, ½, −¼).

A configuration having at least three distinct phases of the fundamental fringe period and including elements corresponding to each of the three phases shifted by an appropriate amount corresponding to its phase may be adopted. The elements corresponding to each of the at least three phases can be grouped into one or more detection areas for each phase.

The detection areas corresponding to the three phases or more phases do not have to be arranged in a given order along the X-direction. The detector areas could also be arranged in a given order in the Y-direction over approximately the same range of the X-direction. The detector areas corresponding to three phases or more phases could also be arranged in a two-dimensional pattern in both X- and Y-directions.

In the above-described displacement encoder, there is no particular restriction on the distance between the scale and the detection unit. However, when the optical device such as a diffraction grating and a lens for condensing diffracted light from the scale to form an image is not disposed between the scale and the detection unit, the distance between the scale and the detection unit is preferably such a distance that interference fringes are appropriately formed on the detection unit.

What is claimed is:

1. A displacement encoder comprising:
a scale with an incremental pattern formed therein;
a detection head movable relative to the scale in a measurement direction, the detection head being configured to detect diffracted light and output a detection result, the diffracted light being obtained by diffraction of light emitted to the scale by the incremental pattern; and
a signal processing unit configured to calculate a relative displacement between the scale and the detection head based on the detection result obtained by the detection head, wherein
the detection head comprises:
a light source configured to emit the light to the scale;
a detection unit comprising a light-receiving unit comprising a plurality of light-receiving elements periodically arranged in the measurement direction with a predetermined period, the plurality of light-receiving elements being configured to output a detection signal of the diffracted light from the scale; and
an optical element configured to guide the diffracted light to the detection unit,
the number of the plurality of light-receiving elements arranged in the measurement direction is an even number,
the predetermined period is a value obtained by multiplying a fundamental period by an odd-number, the fundamental period being a period of interference fringes formed on the light-receiving unit by +1st order diffracted light and −1st order diffracted light of the diffracted light, and a width of the light-receiving element in the measurement direction is not equal to an integral multiple of the fundamental period.

2. The displacement encoder according to claim 1, wherein the +1st order diffracted light, −1st order diffracted light, and 0th order diffracted light from the scale are incident on the detection unit.

3. The displacement encoder according to claim 1, wherein the light-receiving unit comprises a plurality of detection areas arranged in the measurement direction, each detection unit comprises the even number of the light-receiving elements arranged in the measurement direction; and among the plurality of detection areas, two detection areas adjacent to each other are shifted from each other by a distance equivalent to a quarter of the fundamental period so as to be apart from each other in the measurement direction.

4. The displacement encoder according to claim 3, wherein first and second detection areas are arranged in this order in the measurement direction, and the detection unit outputs a detection signal output from the first detection area to the signal processing unit as an A phase signal and outputs a detection signal output from the second detection area to the signal processing unit as a B phase signal.

5. The displacement encoder according to claim 3, wherein first, second, third and fourth detection areas are arranged in this order in the measurement direction, and the detection unit outputs a differential A phase signal and a differential B phase signal to the signal processing unit, the differential A phase signal being a differential signal between an A phase signal and an A− phase signal, the differential B phase signal being a differential signal between a B phase signal and a B− phase signal, the A phase signal being a detection signal output from the first detection area, the A− phase signal being a detection signal output from the third detection area, the B phase signal being a detection signal output from the second detection area, and the B− phase signal being a detection signal output from the fourth detection area.

6. The displacement encoder according to claim 1, wherein the light-receiving unit comprises a plurality of detection areas arranged in the measurement direction, each detection unit comprises the even number of the light-receiving elements arranged in the measurement direction; and among the plurality of detection areas, two detection areas adjacent to each other are shifted from each other by a distance equivalent to one third of the fundamental period so as to be apart from each other in the measurement direction.

7. The displacement encoder according to claim 6, wherein first, second and third detection areas are arranged in this order in the measurement direction in the detection unit, and the detection unit outputs a differential A phase signal and a differential B phase signal to the signal processing unit, the differential A phase signal and the differential B phase signal being generated by combining an A phase signal, a B phase signal, and a C phase signal, and having phases different from each other by 90°, the A phase signal being a detection signal output from the first detection area, the B phase signal being a detection signal output from the second detection area, and the C phase signal being a detection signal output from the third detection area.

8. The displacement encoder according to claim 1, wherein the optical element condenses the +1st order diffracted light and −1st order diffracted light to form the interference fringes on the detection unit.

9. The displacement encoder according to claim 8, wherein the optical element comprises one of a diffraction grating and an optical system comprising one or more lenses.

10. The displacement encoder according to claim 8, wherein the optical element comprises two mirrors, one mirror reflects the +1st order diffracted light to the detection unit, and the other mirror reflects the −1st order diffracted light to the detection unit.

11. The displacement encoder according to claim 2, wherein k is an integer equal to or more than two, the fundamental period is P, k detection areas arranged in a direction traverse to the measurement direction constitute a detection sequence, the detection areas are shifted with respect to each other by a pitch of P/k.

12. The displacement encoder according to claim 11, wherein n is an integer equal to or more than one, k detection sequences are periodically arranged in the measurement direction with a pitch of nP+P/k.

* * * * *